US012071751B2

(12) United States Patent
Cao et al.

(10) Patent No.: US 12,071,751 B2
(45) Date of Patent: Aug. 27, 2024

(54) LIFTING AND LOWERING ROD DEVICE WITH WATER OUTLET TERMINAL AND SHOWER DEVICE

(71) Applicant: Xiamen Solex High-Tech Industries Co., Ltd., Fujian (CN)

(72) Inventors: Bin Cao, Xiamen (CN); Yong Gao, Xiamen (CN); Shaofu Zou, Xiamen (CN); Zhichun Lin, Xiamen (CN); Donghai Chen, Xiamen (CN)

(73) Assignee: Xiamen Solex High-Tech Industries Co., Ltd., Fujian (CN)

( * ) Notice: Subject to any disclaimer, the term of this patent is extended or adjusted under 35 U.S.C. 154(b) by 274 days.

(21) Appl. No.: 17/474,727

(22) Filed: Sep. 14, 2021

(65) Prior Publication Data

US 2022/0081886 A1 Mar. 17, 2022

(30) Foreign Application Priority Data

Sep. 14, 2020 (CN) ......................... 202010960920.3

(51) Int. Cl.
*E03C 1/04* (2006.01)
*B05B 15/658* (2018.01)
*E03C 1/02* (2006.01)

(52) U.S. Cl.
CPC .......... *E03C 1/0408* (2013.01); *B05B 15/658* (2018.02); *E03C 2001/026* (2013.01); *E03C 2001/0414* (2013.01)

(58) Field of Classification Search
CPC ............. E03C 1/0408; E03C 2001/026; E03C 2001/0414; E03C 1/066; B05B 15/658; B05B 15/60; B05B 12/00; B05B 15/68
See application file for complete search history.

(56) References Cited

U.S. PATENT DOCUMENTS 7,219,376 B1 * 5/2007 Zhou ....................... E03C 1/066 4/615
2002/0016988 A1 2/2002 Schiodt
2004/0118949 A1 * 6/2004 Marks ..................... B05B 15/62 239/550

(Continued)

FOREIGN PATENT DOCUMENTS

CN 101536886 A 9/2009
CN 203196804 U 9/2013

(Continued)

OTHER PUBLICATIONS

Corresponding Chinese Patent Application No. 202010960920.3, First Office Action, dated Jun. 25, 2023.

(Continued)

*Primary Examiner* — Qingzhang Zhou

(74) *Attorney, Agent, or Firm* — Cooper Legal Group LLC

(57) ABSTRACT

A lifting and lowering rod device with a water outlet terminal comprises one or more fixed portions configured to be connected to a wall, a lifting and lowering rod assembly connected to the one or more fixed portions, and a water inflow passage configured to be in communication with an external water source. The water outlet terminal is disposed on the lifting and lowering rod assembly, and the water outlet terminal is in communication with the water inflow passage.

13 Claims, 28 Drawing Sheets

(56) References Cited

U.S. PATENT DOCUMENTS

| | | | | |
|---|---|---|---|---|
| 2008/0168600 | A1* | 7/2008 | Gross | E03C 1/0408 4/615 |
| 2008/0185456 | A1 | 8/2008 | McCabe | |
| 2015/0113723 | A1* | 4/2015 | Zhang | E03C 1/0408 4/601 |
| 2016/0059244 | A1 | 3/2016 | Rexach et al. | |
| 2017/0073947 | A1* | 3/2017 | Lev | B05B 3/04 |
| 2018/0126407 | A1 | 5/2018 | Winter et al. | |
| 2019/0224708 | A1* | 7/2019 | Melle | B65H 75/4476 |
| 2019/0365160 | A1* | 12/2019 | Hawkins | B05B 1/16 |

FOREIGN PATENT DOCUMENTS

| | | | |
|---|---|---|---|
| CN | 203235609 | U | 10/2013 |
| CN | 103549902 | A | 2/2014 |
| CN | 203591912 | U | 5/2014 |
| CN | 110711649 | A | 1/2020 |
| CN | 211160272 | U | 8/2020 |
| CN | 214021609 | U | 8/2021 |

OTHER PUBLICATIONS

Corresponding Chinese Patent Application No. 202010960920.3, Notification to Grant Patent, dated Oct. 10, 2023.

Corresponding European Patent Application No. 21196367.3, Extended Search Report, dated Mar. 14, 2022.

* cited by examiner

LIFTING AND LOWERING ROD DEVICE WITH WATER OUTLET TERMINAL AND SHOWER DEVICE

RELATED APPLICATIONS

This application claims priority to Chinese patent application 202010960920.3, filed on Sep. 14, 2020. Chinese patent application 202010960920.3 is incorporated herein by reference.

FIELD OF THE DISCLOSURE

The present disclosure relates to a lifting and lowering rod device of sanitary products, and in particular relates to a lifting and lowering rod device with a water outlet terminal and a shower device.

BACKGROUND OF THE DISCLOSURE

Existing side-spray shower systems comprise a side-spray assembly and a hand-held shower. The side-spray assembly comprises a fixed portion fixed to a wall and at least one side-spray mechanism. The fixed portion comprises a water inflow passage, a first water passage, and a second water passage, the side-spray mechanism can be in communication with the first water passage, the water inflow passage is connected to a support arm through a first hose to introduce a water source to the water inflow passage, and the hand-held shower is in communication with the second water passage through a second hose. A switching mechanism is further disposed on the fixed portion, and the switching mechanism cooperates with the water inflow passage, the first water passage, and the second water passage to switch the first water passage and the second water passage to be in communication with the water inflow passage so as to control water to flow out of the hand-held shower or the side-spray mechanism. Existing side-spray shower systems have the deficiencies, namely having a single function.

BRIEF SUMMARY OF THE DISCLOSURE

The present disclosure provides a lifting and lowering rod device with a water outlet terminal and a shower device to solve the deficiencies of the side-spray shower systems in the background.

In order to solve the technical problems, a solution of the present disclosure is as follows. A lifting and lowering rod device with a water outlet terminal, which comprises one or more fixed seats configured to be connected to a wall, a lifting and lowering rod assembly connected to the one or more fixed seats, and a water inflow passage configured to be in communication with an external water source. The water outlet terminal is disposed on the lifting and lowering rod assembly, and the water outlet terminal is in communication with the water inflow passage.

In an embodiment, an inserting base is slidably connected to the lifting and lowering rod assembly and is configured to slide up and down (e.g., vertically) along the lifting and lowering rod assembly.

In an embodiment, the water outlet terminal is fixed to the lifting and lowering rod assembly and comprises a plurality of water outlet nozzles, and at least some of the plurality of water outlet nozzles are disposed in an up-and-down direction (e.g., a vertical direction).

In an embodiment, the water outlet terminal comprises a water outlet cavity base fixedly disposed in the lifting and lowering rod assembly, an inner side of the water outlet cavity base defines a water outlet cavity, the water outlet cavity base comprises a plurality of mounting holes in communication with the water outlet cavity, and the plurality of water outlet nozzles are respectively connected to the plurality of mounting holes and are in communication with the water outlet cavity through the plurality of mounting holes.

In an embodiment, the water outlet terminal comprises a cover fixed to the water outlet cavity base, the cover comprises a plurality of matching holes, the plurality of water outlet nozzles respectively pass through the plurality of matching holes, and the plurality of matching holes cooperate with the plurality of mounting holes to enable the plurality of water outlet nozzles to be configured to swing relatively.

In an embodiment, the lifting and lowering rod device comprises a switching mechanism disposed on the lifting and lowering rod assembly. The switching mechanism comprises at least two water dividing holes configured to be switched to be in communication with the water inflow passage, and one of the at least two water dividing holes is in communication with the water outlet terminal.

In an embodiment, the switching mechanism comprises a valve base and a valve core movably disposed in the valve base, the valve base comprises a water inlet configured to be in communication with the water inflow passage and the at least two water dividing holes, two water dividing holes of the at least two water dividing holes are disposed up and down, wherein an opening of an upper water dividing hole of the two water dividing holes faces upward and is communication with the water outlet terminal, and an opening of a lower water dividing hole of the two water dividing hole faces downward.

In an embodiment, the switching mechanism comprises an operating member, and the operating member is operatively connected to the valve core and at least partially extends out of the lifting and lowering rod assembly.

In an embodiment, a lower portion of the lifting and lowering rod assembly is disposed with the switching mechanism, and another one of the at least two water dividing holes is configured to extend out of a bottom end of the lifting and lowering rod assembly.

In an embodiment, the lifting and lowering rod device comprises a water inflow joint configured to be in communication with the external water source. The water inflow passage is disposed in the lifting and lowering rod assembly and is in communication with the water inflow joint and the switching mechanism.

In an embodiment, a lower portion of the lifting and lowering rod assembly is disposed with the switching mechanism, the switching mechanism comprises a valve base and a valve core movably disposed in the valve base, the valve base comprises a water inlet configured to be in communication with the water inflow passage and the at least two water dividing holes, and the water inflow passage is in communication with the water inflow joint and the water inlet.

In an embodiment, the switching mechanism comprises a valve base and a valve core movably disposed in the valve base, the valve base comprises a water inlet configured to be in communication with the water inflow passage and the at least two water dividing holes, and the water inflow passage comprises the water inlet.

In an embodiment, a lower portion of the lifting and lowering rod assembly is disposed with the switching mechanism, and an outer port of the water inflow passage extends out of a bottom end of the lifting and lowering rod assembly.

In an embodiment, wherein the one or more fixed seats are disposed with the water inflow joint.

In an embodiment, the one or more fixed seats comprise two fixed seats separately disposed up and down, wherein an upper fixed seat of the two fixed seats comprises the water inflow joint.

In an embodiment, the one or more fixed seats comprise two fixed seats separately disposed up and down, the two fixed seats are separated up and down and respectively define an upper fixed seat and a lower fixed seat, the lower fixed seat comprises a supporting portion, the lifting and lowering rod assembly comprises a lifting and lowering rod unit and a sliding block, the lifting and lowering rod unit comprises an assembly hole penetrating an inner side and an outer side of the lifting and lowering rod unit, the sliding block is slidably connected to an inner side of the lifting and lowering rod unit and is configured to slide up and down between a locked position and an unlocked position, a lower portion of the lifting and lowering rod unit abuts an upper side of the supporting portion, the upper fixed seat cooperates with and is disposed in the assembly hole of the lifting and lowering rod unit, the sliding block cooperates with the upper fixed seat to define a locking mechanism, when the sliding block is in the locked position, the locking mechanism is in a locked state in which a movement of the lifting and lowering rod unit relative to the upper fixed seat is restricted, and when the sliding block is in the unlocked position, the locking mechanism is in an unlocked state released from the locked state.

In an embodiment, the locking mechanism comprises an elastic body abutting and connected between the sliding block and the lifting and lowering rod unit, and an elastic force in a direction from the unlocked position to the locked position is generated by the elastic body and is configured to abut the sliding block.

In an embodiment, the lifting and lowering rod assembly is connected to the one or more fixed seats and is configured to slide up and down.

In an embodiment, the water inflow passage is in communication with a water pipe configured to be in communication with the external water source, and the water pipe is telescopic or is made of flexible material.

In an embodiment, a gear component is disposed on the one or more fixed seats, the gear component comprises a gear configured to rotate, a gear rack is fixed to the lifting and lowering rod assembly, and the gear rack is engaged with the gear.

In an embodiment, the gear component comprises a one-way loaded damping component and the gear, and the gear is connected to the one-way loaded damping component.

In an embodiment, the one-way loaded damping component comprises a rotating housing and a rotating shaft, an outer side of the rotating housing is evenly disposed with first gear teeth, the rotating shaft is rotatably disposed in the rotating housing, a friction force exists between the rotating shaft and the rotating housing, the gear is fixed to the rotating shaft, the outer side of the rotating housing is disposed with the gear, the one or more fixed seats are concave to define a mounting groove, a groove bottom of the mounting groove comprises second gear teeth, the one-way loaded damping component is disposed in the mounting groove, the rotating housing is configured to rotate and move up and down relative to the mounting groove, when the lifting and lowering rod assembly moves upward, the gear is driven to move upward to enable the first gear teeth to be separated from the second gear teeth, and when the lifting and lowering rod assembly moves downward, the first gear teeth are engaged with the second gear teeth.

In an embodiment, a rear surface of the lifting and lowering rod assembly is concave to define a connecting groove, the gear rack is fixedly disposed in the connecting groove, and the one or more fixed seats cooperate with and are connected to an inner side of the connecting groove.

In an embodiment, an elastic body assembly is disposed between the one or more fixed seats and the lifting and lowering rod assembly, the elastic body assembly comprises a spring, a pull rope, and a pulley block, the pulley block comprises a moving pulley, the pull rope wraps around the pulley block, two ends of the pull rope are respectively connected to the one or more fixed seats and the lifting and lowering rod assembly, and the spring is connected to the moving pulley of the pulley block.

In an embodiment, the lifting and lowering rod assembly is connected to the one or more fixed seats and is configured to slide up and down, and the water inflow passage comprises a water pipe that is telescopic or made of flexible material.

In order to solve the technical problems, a solution of the present disclosure is as follows. A shower device comprising the lifting and lowering rod device with the water outlet terminal.

Compared with the existing techniques, the technical solution has the following advantages.

The lifting and lowering rod assembly combines lifting and lowering, water inflow, and water outflow together, so that multi-functions are integrated in one structure. Further, the lifting and lowering rod assembly is disposed with a water outlet terminal, a shower is completed without external products, and a spay coverage of water is wider and a shower experience is better.

At least some of the plurality of water outlet nozzles of the water outlet terminal are arranged in an up-and-down direction (e.g., in a vertical direction), and the vertical arrangement is combined with a up-and-down sliding of the inserting bases of the lifting and lowering rod assembly, it is more attractive, and a spray coverage of water is wider.

The water outlet terminal comprises a water outlet cavity base fixedly disposed in the lifting and lowering rod assembly, and the plurality of water outlet nozzles are respectively connected to the mounting holes and are in communication with the water outlet cavity through the mounting holes, an assembly is convenient, a structure is more compact, and a sealing performance design is better.

The lifting and lowering rod assembly is also combined with a switching function, the structure is compact, and switching operations are convenient for users.

The upper water dividing hole faces upward and is in communication with the water outlet terminal, and the lower water dividing hole face downward. The layout is reasonable and the structure is compact. It is convenient to be in communication with the water outlet terminal and be in communication with another water outlet terminal.

The lower portion of the lifting and lowering rod assembly is disposed with the switching mechanism, and another water dividing hole can extend out of the bottom end of the lifting and lowering rod assembly, which is convenient to control the switching and can be in communication with another water outlet terminal.

The lifting and lowering rod device also comprises a water inflow joint that can be in communication with an external water source. The water inflow passage is disposed in the lifting and lowering rod assembly and is in communication with the water inflow joint and the switching mechanism. The structure is compact and the assembly is convenient.

The water inflow passage comprises a water inlet to facilitate to be in communication with an external water source.

BRIEF DESCRIPTION OF THE DRAWINGS

The present disclosure will be further described below in combination with the accompanying drawings and embodiments.

Figure 1:
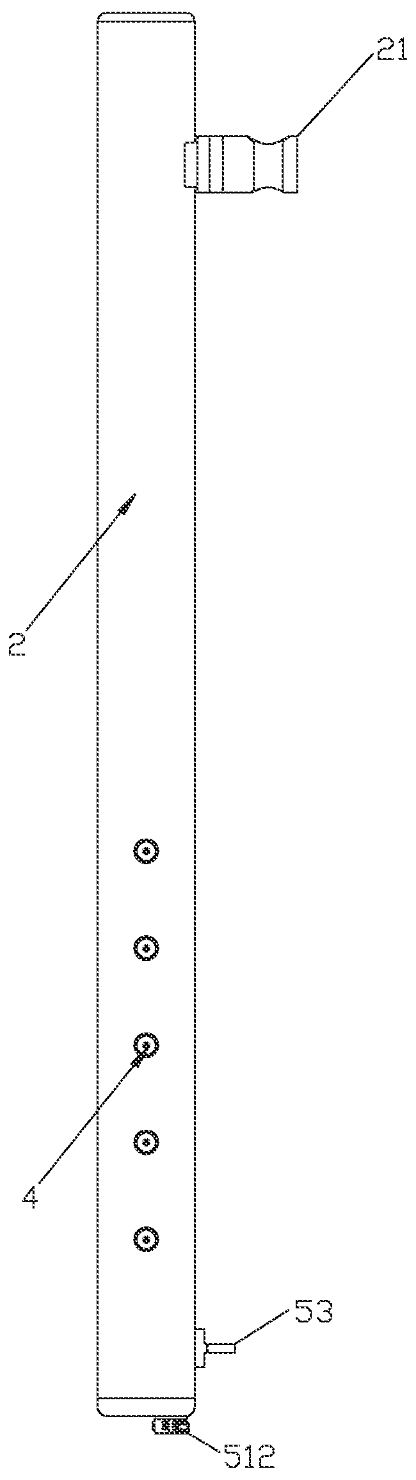
FIG. 1 illustrates a front view of a lifting and lowering rod device of Embodiment 1.
Figure 2:
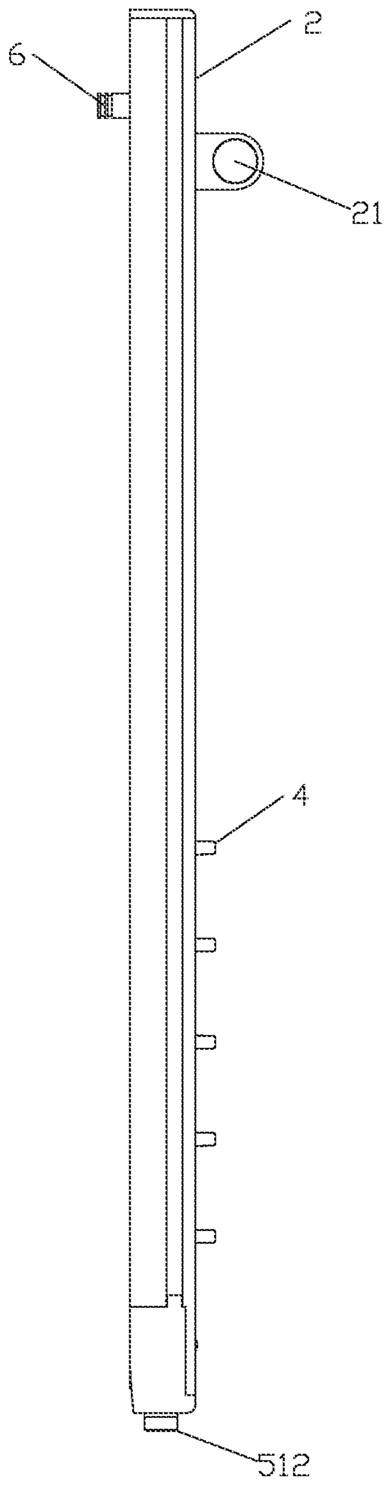
FIG. 2 illustrates a left view of the lifting and lowering rod device of Embodiment 1.
Figure 3:
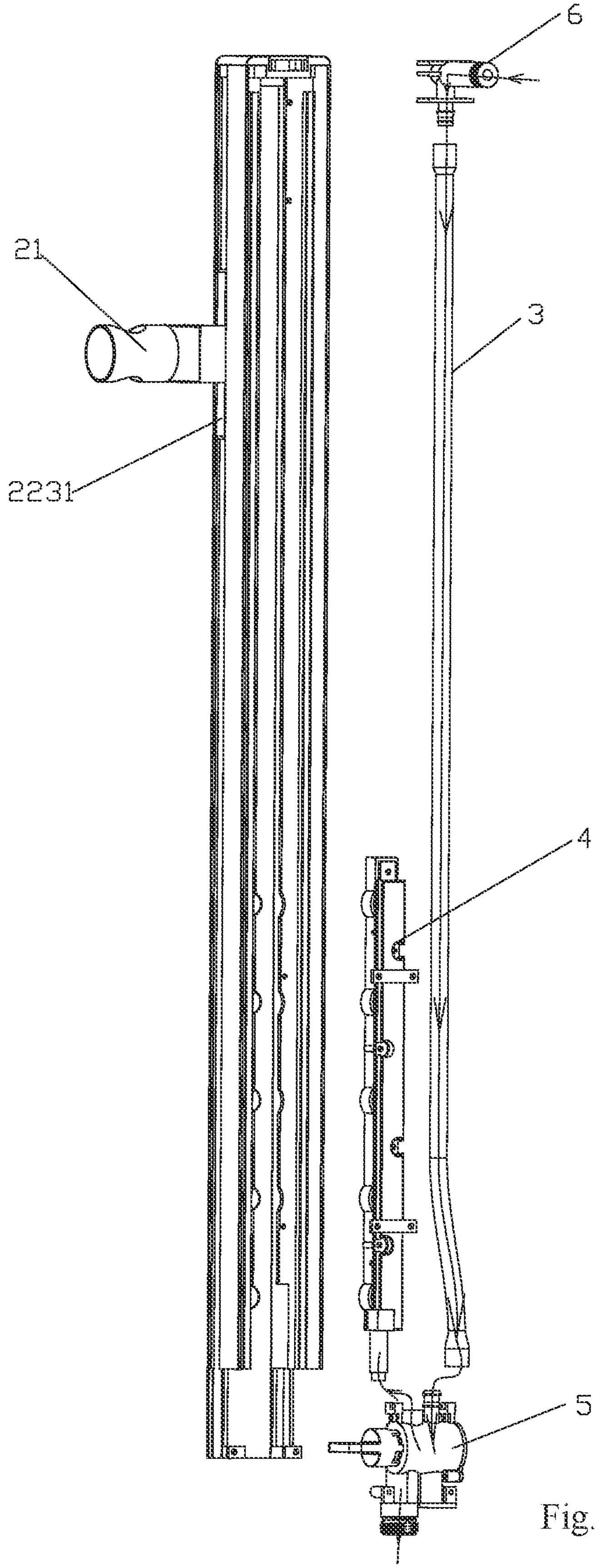
FIG. 3 illustrates an exploded perspective view of the lifting and lowering rod device of Embodiment 1.
Figure 4:
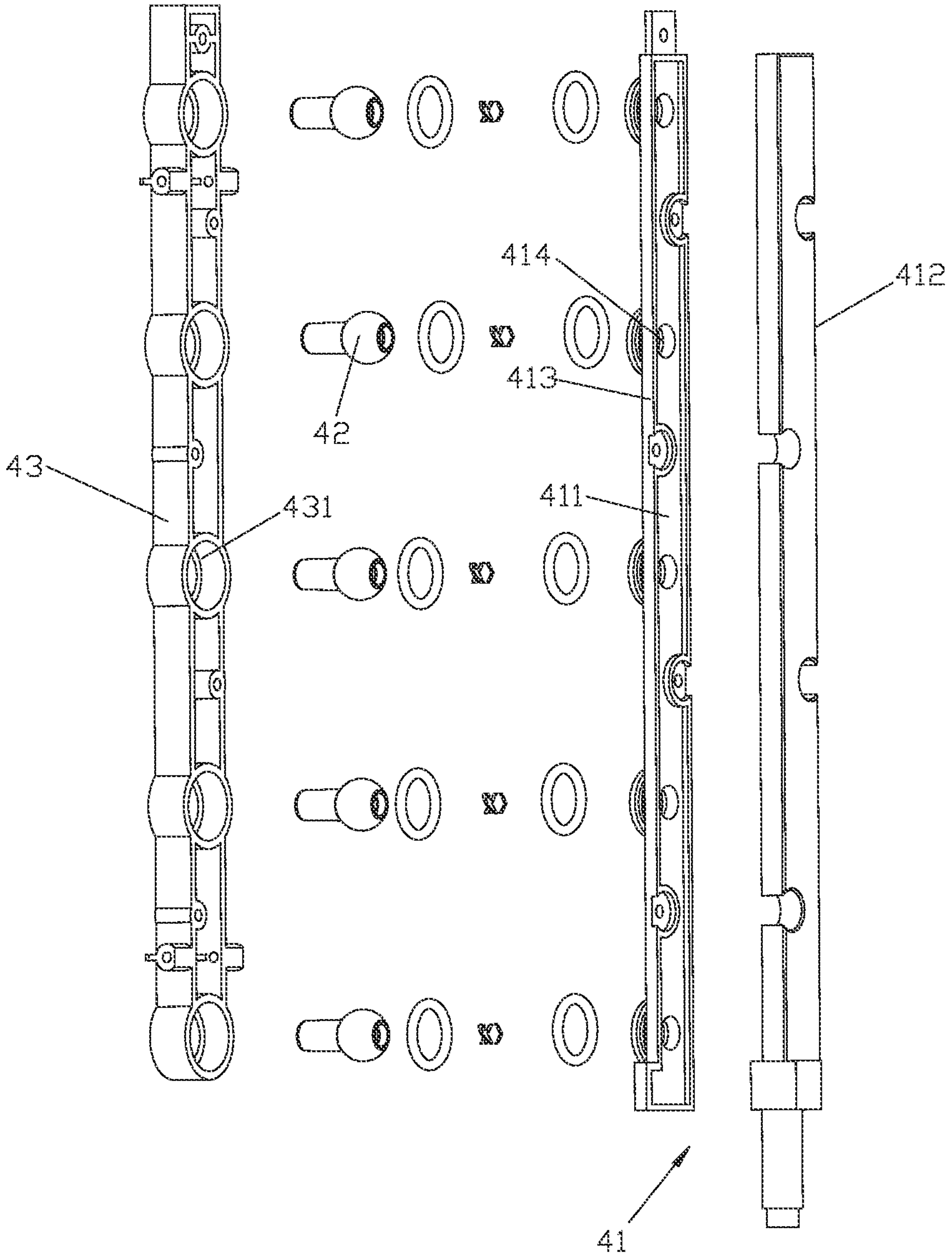
FIG. 4 illustrates an exploded perspective view of a water outlet terminal of Embodiment 1.
Figure 5:
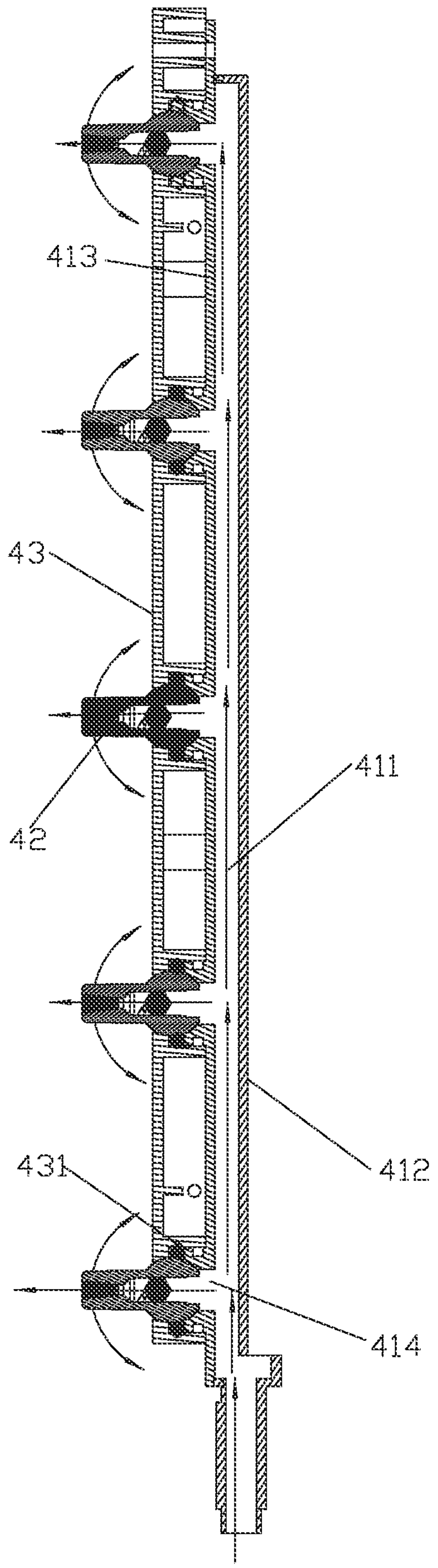
FIG. 5 illustrates a cross-sectional view of the water outlet terminal of Embodiment 1.
Figure 6:
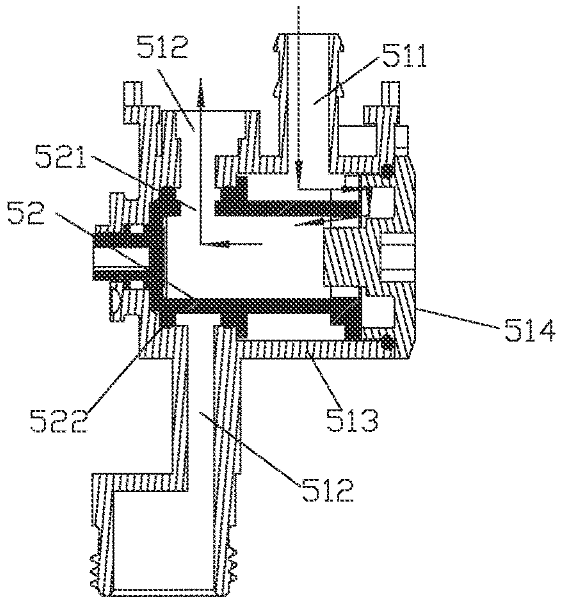
FIG. 6 illustrates a first cross-sectional view of a switching mechanism of Embodiment 1 when water flows out of an upper water dividing hole.
Figure 7:
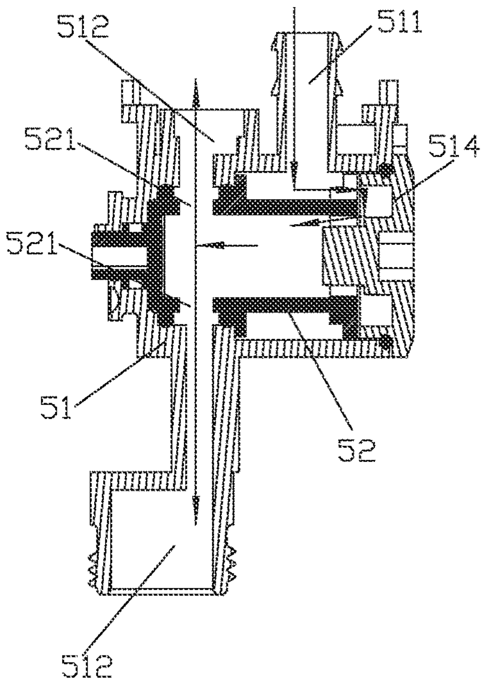
FIG. 7 illustrates a second cross-sectional view of the switching mechanism of Embodiment 1 when the water flows out of the upper water dividing hole and a lower water dividing hole.
Figure 8:
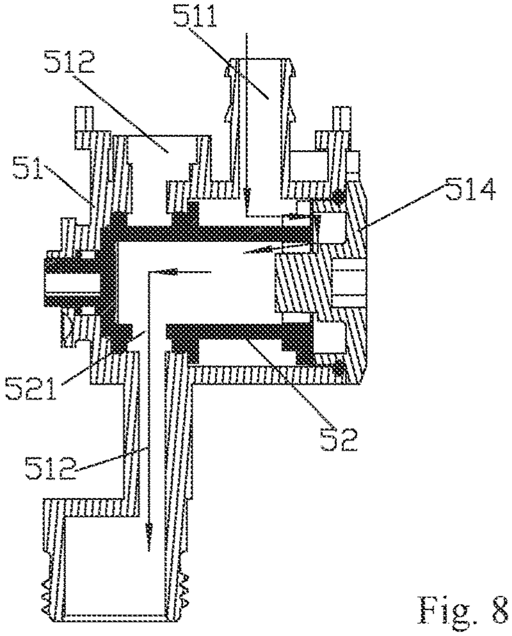
FIG. 8 illustrates a third cross-sectional view of the switching mechanism of Embodiment 1 when the water flows out of the lower water dividing hole.
Figure 9:
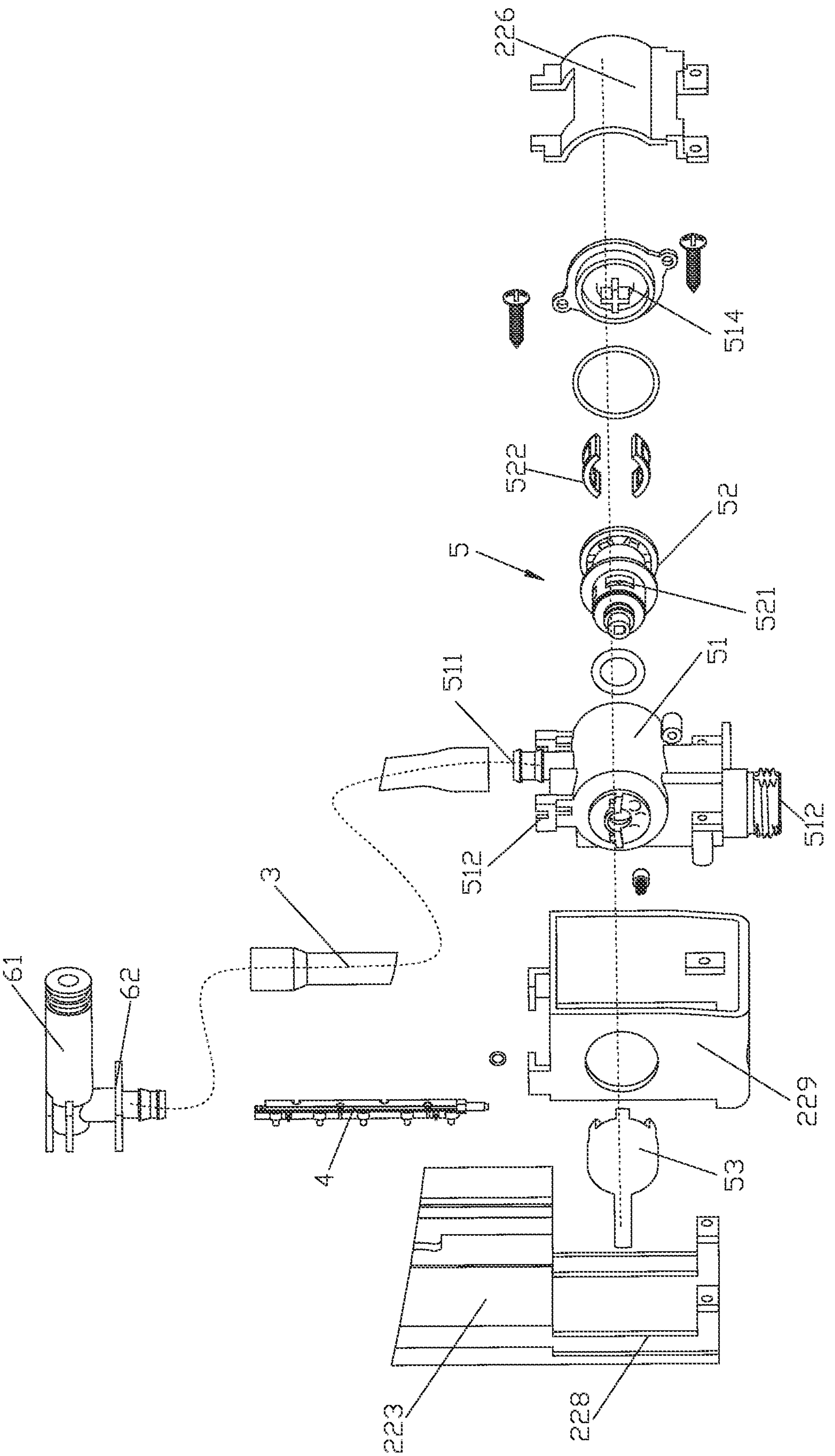
FIG. 9 illustrates an exploded perspective view of the switching mechanism of Embodiment 1.
Figure 10:
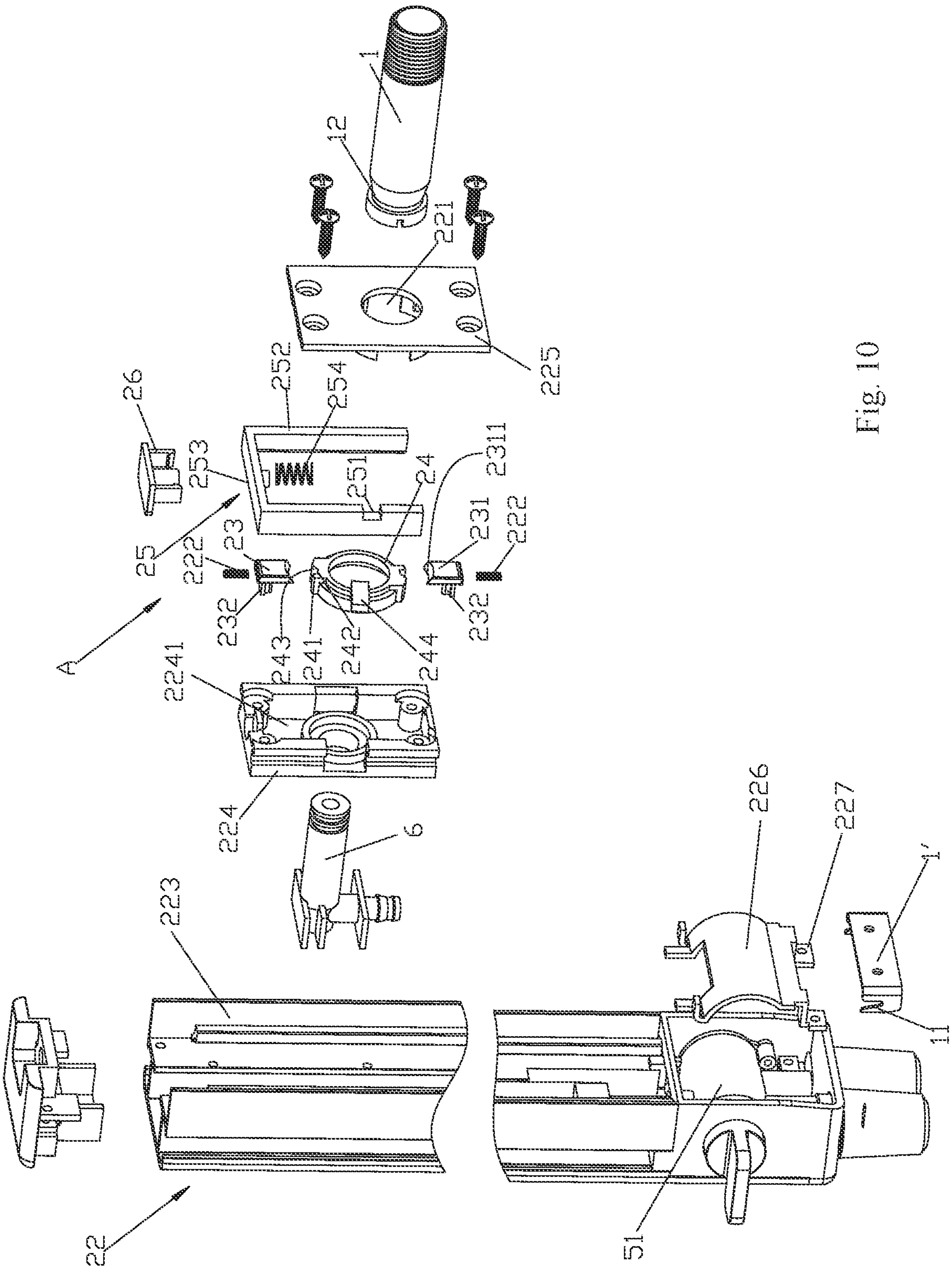
FIG. 10 illustrates an exploded perspective view of an upper fixed seat and a lifting and lowering rod unit.
Figure 11:
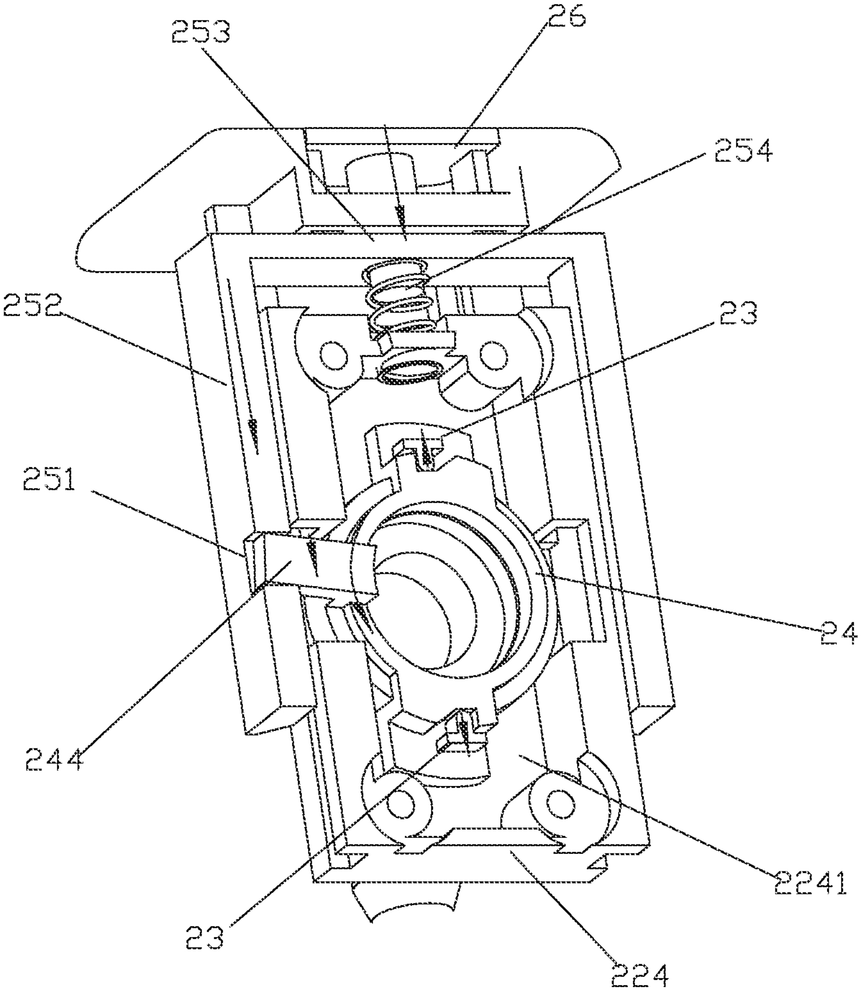
FIG. 11 illustrates a first structural drawing of the upper fixed seat and the lifting and lowering rod unit when a locking mechanism is in a locked state.
Figure 12:
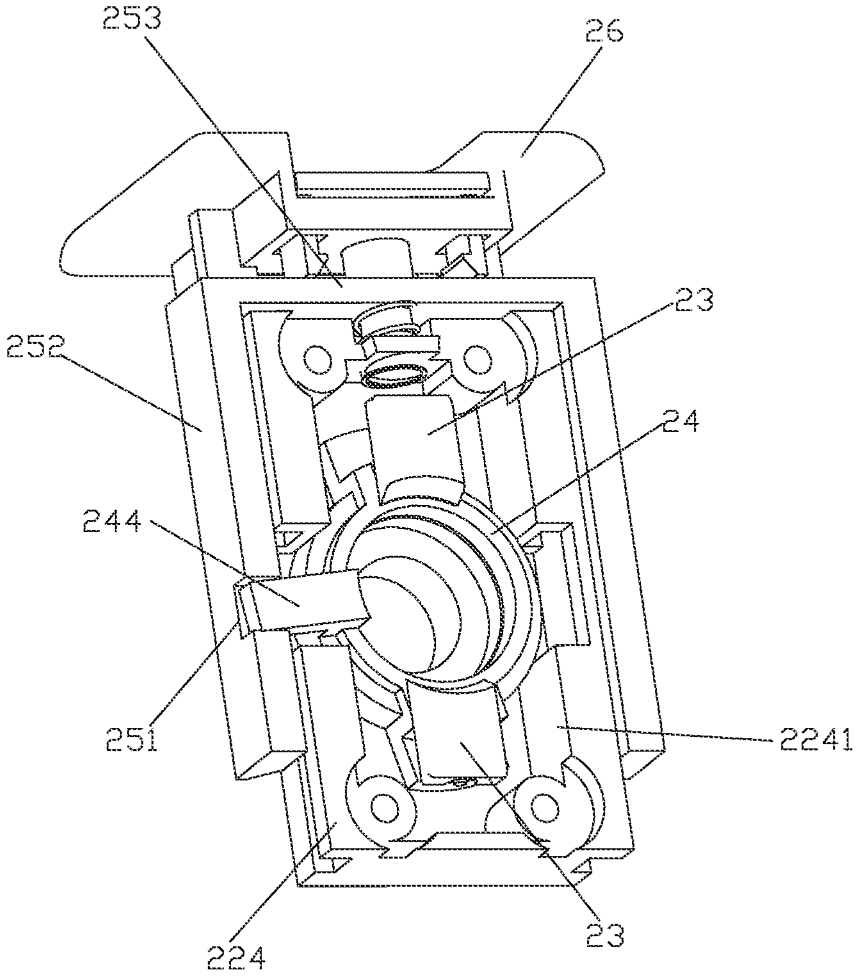
FIG. 12 illustrates a second structural drawing of the upper fixed seat and the lifting and lowering rod unit when the locking mechanism is in an unlocked state.
Figure 13:
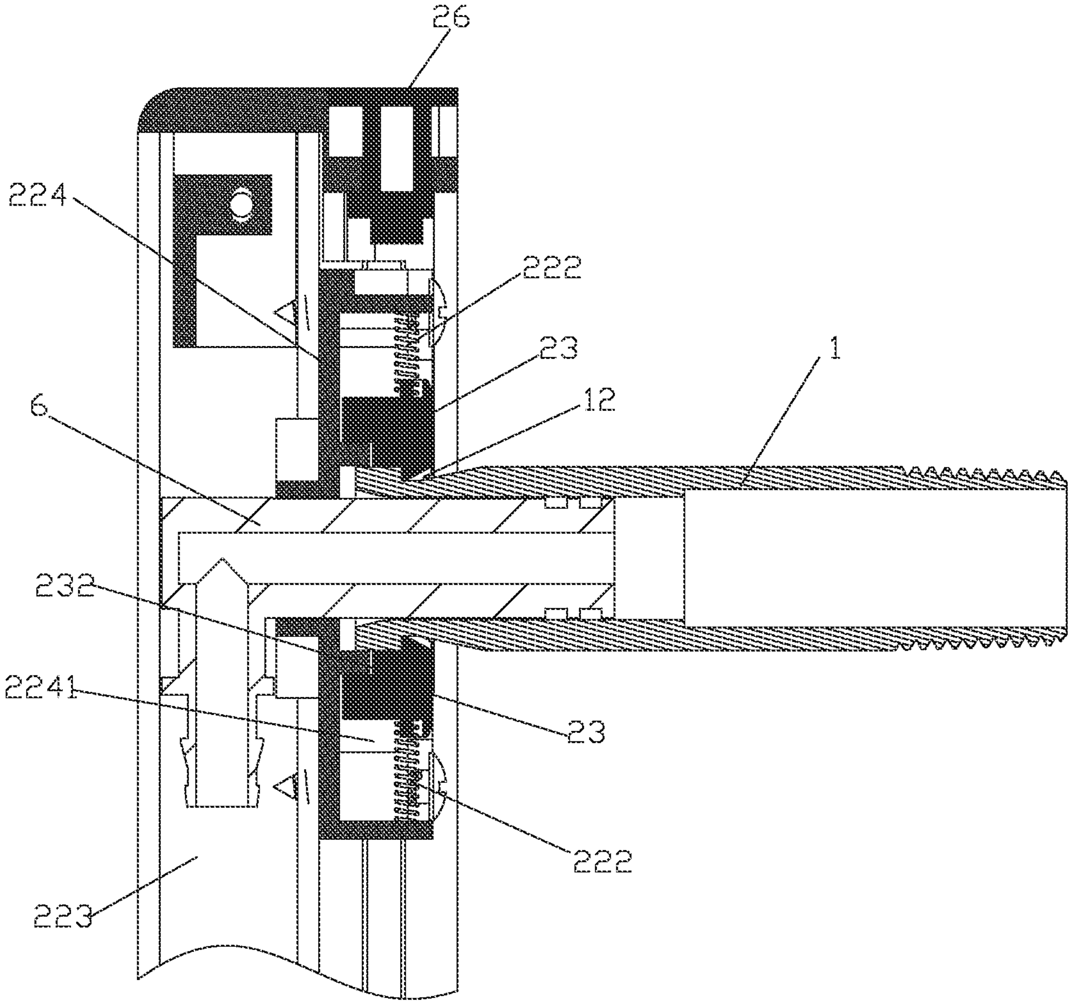
FIG. 13 illustrates a cross-sectional view of the upper fixed seat and the lifting and lowering rod unit.
Figure 14:
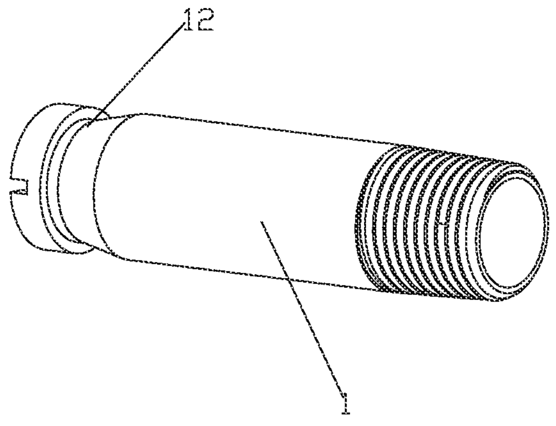
FIG. 14 illustrates a perspective view of the upper fixed seat.
Figure 15:
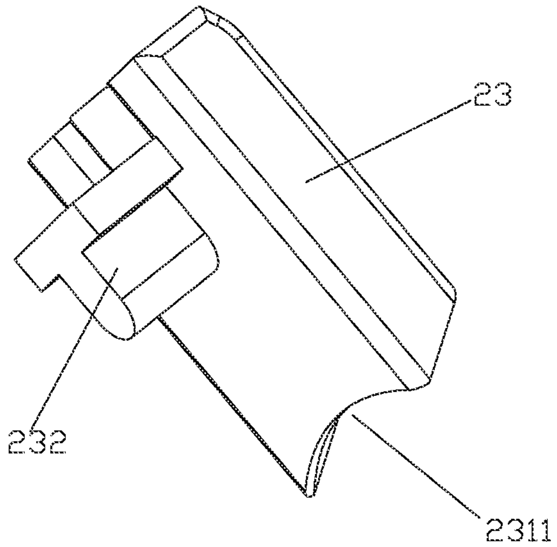
FIG. 15 illustrates a perspective view of a sliding block.
Figure 16:
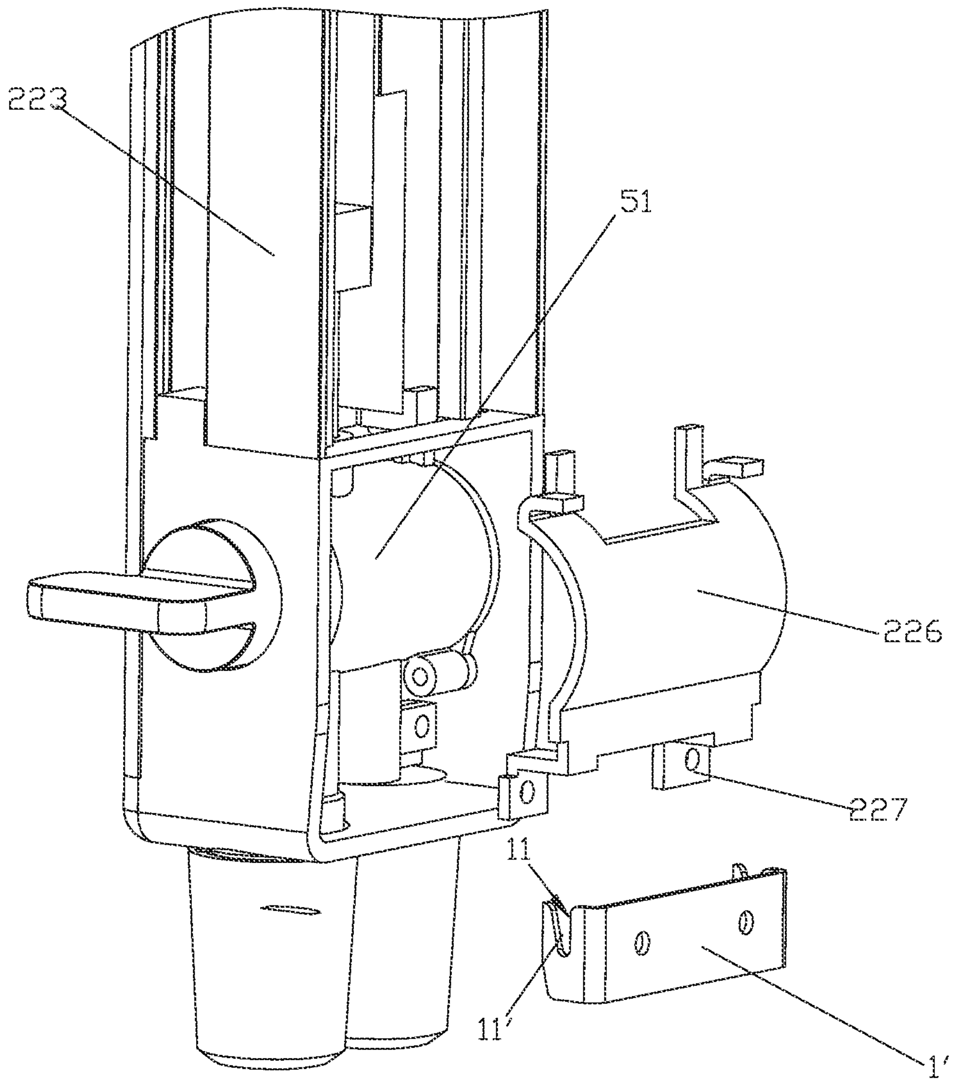
FIG. 16 illustrates a structural drawing of a lower fixed seat and the lifting and lowering rod unit.

Reference numbers: upper fixed seat 1, lower fixed seat 1', lifting and lowering rod assembly 2, water inflow passage 3, water outlet terminal 4, switching mechanism 5, water inflow joint 6, inserting base 21, lifting and lowering rod unit 22, mounting groove 228, housing 229, water outlet cavity base 41, water outlet nozzle 42, cover 43, water outlet cavity 411, water outlet body 412, water dividing body 413, mounting hole 414, matching holes 431, switching mechanism 5, valve base 51, valve core 52, operating member 53, water inlet 511, water dividing hole 512, valve body 513, sealing cover 514, water hole 521, horizontal section 61, vertical section 62, supporting portion 11, positioning groove 11', locking groove 12, locking mechanism A, inserting base 21, lifting and lowering rod unit 22, assembly hole 221, first elastic bodies 222, lifting and lowering rod 223, guiding rail 2231, fixed base 224, assembly cavity 2241, fixed cover 225, fixed block 226, matching member 227, sliding blocks 23, inserting portion 231, arc-shaped structure 2311, interlocking portions 232, rotating base 24, convex base 241, matching groove 242, guiding surface 243, toggle arm 244, sliding member 25, toggle groove 251, side wall 252, top wall 253, second elastic body 254, button 26, gear component 13, one-way loaded damping component 131, gear 132, gear rack 2201, and connecting groove 2202.

DETAILED DESCRIPTION OF THE EMBODIMENTS

Embodiment 1

Referring to FIGS. 1-9, a lifting and lowering rod device with a water outlet terminal comprises two fixed seats 1 and 1' configured to be fixed to a wall, a lifting and lowering rod assembly 2 fixed to the two fixed seats 1 and 1', and a water inflow passage 3 configured to be in communication with an external water source. Not only is the water outlet terminal 4 disposed on the lifting and lowering rod assembly 2 and the water outlet terminal is in communication with the water inflow passage 3, but also an inserting base 21 is slidably connected to the lifting and lowering rod assembly 2 and is configured to slide up and down (e.g., vertically) along the lifting and lowering rod assembly 2. In this detailed embodiment, the lifting and lowering rod assembly 2 combines lifting and lowering, water inflow, and water outflow together, so that multi-functions are integrated in one structure. Further, the lifting and lowering rod assembly 2 is disposed with a water outlet terminal, a shower is completed without external products, and a spay coverage of water is wider and a shower experience is better.

Referring to FIGS. 10-16, the two fixed seats 1 and 1' are separated up and down and respectively to define an upper fixed seat 1 and a lower fixed seat 1'. The lifting and lowering rod assembly 2 comprises a lifting and lowering rod unit 22 and sliding blocks 23. The lower fixed seat 1' is disposed with a supporting portion 11, and a lower portion of the lifting and lowering rod unit 22 abuts and is connected to the supporting portion 11. The lifting and lowering rod unit 22 comprises an assembly hole 221 penetrating an inner side and an outer side of the lifting and lowering rod unit 22. The sliding blocks 23 are slidably connected to the inner side of the lifting and lowering rod unit 22 and are configured to slide up and down between locked positions and unlocked positions. The upper fixed seat 1 cooperates with and is disposed in the assembly hole 221 of the lifting and lowering rod unit 22. The sliding blocks 23 cooperate with the upper fixed seat 1 to define a locking mechanism A. When the sliding blocks 23 are in the locked positions, the locking mechanism A is in a locked state configured to prevent the lifting and lowering rod unit 22 from moving relative to the upper fixed seat 1. When the sliding blocks 23 are in the unlocked positions, the locking mechanism A is in an unlocked state released from the locked state. In the quick-assembly lifting and lowering rod device of this embodiment, first, the sliding blocks 23 slide up and down to control whether the upper fixed seat 1 is pulled out of the lifting and lowering rod unit 22 or not, and the supporting portion 11 cooperates with the assembly hole 221 to prevent the lifting and lowering rod unit 22 from moving up and down. A combination of the two (i.e., the supporting portion 11 and the assembly hole 221) enables the lifting and lowering rod unit 22 to be firmly fixed. The slide blocks 23 slide up and down to control an assembly and a disassembly. The assembly and the disassembly are convenient, and the quick assembly is achieved. Second, the assembly enables the lifting and lowering rod unit 22 to abut the wall, and the structure is more compact. The locking mechanism A further comprises first elastic bodies 222 that abut and are connected between the sliding blocks 23 and the lifting and lowering rod unit 22, and elastic forces in directions from the unlocked positions to the locked positions are generated by the first elastic bodies 222 and are configured to abut the sliding blocks 23, so that firm performance and stable reliability after the assembly are improved. A front end of the upper fixed seat 1 comprises a locking groove 12, and the sliding blocks 23 comprise inserting portions 231. When the sliding blocks 23 are in the locked positions, the inserting portions 231 are disposed in the locking groove 12. When the sliding blocks 23 are in the unlocked positions, the inserting portions 231 are pulled out of the locking groove 12. The locking or the unlocking are thus controlled.

In this embodiment, the locking mechanism A further comprises a rotating base 24. The rotating base 24 is rotatably disposed in the lifting and lowering rod unit 22 (in a lifting and lowering rod 223 of the lifting and lowering rod unit 22), and the sliding blocks 23 cooperate with the rotating base 24 to drive the sliding blocks 23 to slide due to a rotation of the rotating base 24. For example, an outer wall of the rotating base 24 comprises guiding surfaces 243. Interlocking portions 232 are fixedly disposed on the sliding blocks 23, and the interlocking portions 232 cooperate with the guiding surfaces 243 to drive the sliding blocks 23 to slide due to the rotation of the rotating base 24, thus an operation is convenient and quick. In a detailed structure: the outer wall of the rotating base 24 protrudes to define convex bases 241. The convex bases 241 are concave to define matching grooves 242, and the matching grooves 242 comprise groove walls obliquely disposed. The groove walls define the guiding surfaces 243 obliquely disposed, and the interlocking portions 232 abuts the guiding surfaces 243. The lock groove 12 defines an annular structure surrounding a tail end of the upper fixed seat 1. The inserting portions 231 comprise arc-shaped structures 2311 (or U-shaped structures) configured to cooperate with the locking groove 12. The sliding blocks 23 comprise two sliding blocks, namely an upper sliding block and a lower sliding block. The upper sliding block and the lower sliding block are disposed up and down relative to the locking groove 12 so as to be configured to be disposed in the locking groove 12 up and down. In the same way, the convex bases 241 comprise two convex bases respectively configured to drive the two sliding blocks to slide close to each other up and down or to slide opposite to each other up and down. The first elastic bodies 222 comprise two first elastic bodies, and the two first elastic bodies 222 respectively abut the two sliding blocks 23 to downwardly abut the upper sliding block to be downwardly disposed in the locking groove 12 and upwardly abut the lower sliding block to be upwardly disposed in the locking groove 12 to enhance a locking strength.

In this embodiment, the locking mechanism A further comprises a sliding member 25 slidably connected to the lifting and lowering rod unit 22 and configured to slide up and down. The rotating base 24 is fixed to a toggle arm 244, and the sliding member 25 is concave to define a toggle groove 251. The toggle arm 244 cooperates with and is disposed in the toggle groove 251, so that the sliding member 25 slides up and down to drive the rotating base 24 to swing. The sliding member 25 comprises a top wall 253 and two side walls 252 fixed to two sides of the top wall 253. The rotating base 24 is fixed to the toggle arm 244, and the two side walls 252 are concave to define the toggle groove 251. The toggle arm 244 cooperates with and is disposed in the toggle groove 251, so that the sliding member 25 slides up and down to drive the rotating base 24 to swing. A cooperation between the toggle arm 244 and the toggle groove 251 is similar to a toggle fork structure. A second elastic body 254 is disposed between the top wall 253 and the lifting and lowering rod unit 22 to enable the top wall 253 to be reset. A button 26 is further provided, and the button 26 abuts the top wall 253 for pressing operation by the user.

In this embodiment, the lifting and lowering rod unit 22 comprises the lifting and lowering rod 223, a fixed base 224, and a fixed cover 225. The fixed base 224 is fixed to an upper portion of the lifting and lowering rod 223, and the fixed base 224 comprises an assembly cavity 2241. The rotating base 24, the sliding blocks 23, and the first elastic bodies 222 are disposed in the assembly cavity 2241. The fixed cover 225 fixedly covers a cavity opening of the assembly cavity 2241, and the fixed cover 225 comprises the assembly hole 221. The upper fixed seat 1 passes through the assembly hole 221 of the fixed cover 225 and is disposed in the assembly cavity 2241. The upper fixed seat 1 is screwed to a cantilever 72, and the cantilever 72 is fixed to the wall and is configured to supply water to an external side. The lifting and lowering rod 223 comprises a guiding rail 2231, and the inserting base 21 is slidably connected to the guiding rail 2231.

In this embodiment, an upper side of the lower fixed seat 1' is concave to define a positioning groove 11', and the positioning groove 11' defines the supporting portion 11. The lifting and lowering rod unit 22 further comprises a fixed block 226 fixed to an inner side of a lower end of the lifting and lowering rod 223. The fixed block 226 comprises a matching member 227, and the matching member 227 is disposed in the positioning groove 11' of the lower fixed seat 1'.

When being assembled, the matching member 227 of the lifting and lowering rod 223 is disposed in the positioning groove 11' of the lower fixed seat 1'. A force facing the wall is applied to an upper end of the lifting and lowering rod 223, so that the inserting portions 231 are pressed into the locking groove 12 of the upper fixed seat 1 to enable the lifting and lowering rod 223 to be fixed to the wall. When being disassembled, the top wall 253 of the sliding member 25 is pressed, the toggle arm 244 cooperates with the toggle groove 251 to drive the rotating base 24 to rotate, and the sliding blocks 23 are pushed away due to the guiding surfaces 243 so that the inserting portions 231 are separated from an insertion groove (i.e., the locking groove 12). In this way, the releasing is achieved, and the lifting and lowering rod 223 can be dissembled.

Referring to FIGS. 1-9, the water outlet terminal 4 comprises a water outlet cavity base 41 fixedly disposed in the lifting and lowering rod 223, a plurality of water outlet nozzles 42, and a cover 43 fixed to the water outlet cavity base 41. An inner side of the water outlet cavity base 41 defines a water outlet cavity 411. The water outlet cavity base 41 comprises a water outlet body 412 and a water dividing body 413. The water outlet body 412 faces and is fixed to the water dividing body 413 to define the water outlet cavity 411. The water dividing body 413 comprises a plurality of mounting holes 414 in communication with the water outlet cavity 411 and arranged in an up-and-down direction. The cover 43 comprises a plurality of matching holes 431 arranged in the up-and-down direction (e.g., in a vertical direction). The plurality of water outlet nozzles 42 respectively pass through the plurality of matching holes 431 and are respectively connected to the plurality of mounting holes 414 to be in communication with the water outlet cavity 411 through the plurality of mounting holes 414 so that the plurality of matching holes 431 cooperate with the plurality of mounting holes 414 to enable the plurality of water outlet nozzles 42 to be arranged in the up-and-down direction and to be configured to swing in any direction. In this way, the user is able to control water outflow direction due to the swinging in any direction. The cover 43 is embedded in a front wall of the lifting and lowering rod unit 22.

The lifting and lowering rod device with the water outlet terminal further comprises a switching mechanism 5 disposed in the lifting and lowering rod 223. The switching mechanism 5 comprises a valve base 51 fixed in the lifting and lowering rod 223, a valve core 52 rotatably disposed in the valve base 51, and an operating member 53. The valve base 51 comprises a water inlet 511 configured to be in communication with the water inflow passage 3 and two water dividing holes 512. The two water dividing holes 512 are disposed up and down, and an opening of a water dividing hole of the two water dividing holes 512 disposed on an upper side (an upper water dividing hole) faces upward and is in communication with the water outlet cavity 411 of the water outlet terminal 4. A water dividing hole of the two water dividing holes 512 disposed on a lower side (a lower water dividing hole) faces downward. The operating member 53 is operatively connected to the valve core 52 and at least partially extends out of the lifting and lowering rod unit 22 for an operation and a control by the user. In this detailed embodiment, the lower portion of the lifting and lowering rod unit 22 is disposed with the switching mechanism 5, the lower water dividing hole extends out of a bottom end of the lifting and lowering rod assembly 2 to be configured to be connected to another external water outlet terminal, for example, to be in communication with a hand-held shower through a hose (not illustrated in the figures), and the hand-held shower is configured to be disposed in the inserting base 21. The water inlet 511 is also disposed on an upper side of the valve base 51 and an opening of the water inlet 511 faces upward. In a detailed structure, the valve base 51 comprises a valve body 513, the valve body 513 is horizontally disposed and comprises two end opening (e.g., a rear end opening and another opening), the rear end opening is hermetically fixed to a sealing cover 514, and a peripheral wall of the valve body 513 comprises the water inlet 511 and the two water dividing holes 512. The valve core 52 is a valve shaft, the valve shaft is hermetically and rotatably connected to an inner side of the valve body 513, and a tail end of the valve shaft extends out of another opening to be fixed to the operating member 53. The valve shaft comprises a water hole 521, and the valve shaft rotates to enable the water hole 521 to be aligned with the two water dividing holes 512 to achieve switching. As needed, a sealing gasket 522 is further fixed to an outer side of the valve shaft.

The lifting and lowering rod device with the water outlet terminal 4 further comprises a water inflow joint 6 configured to be in communication with the external water source. The water inflow joint 6 defines an L-shaped structure and comprises a horizontal section 61 and a vertical section 62. One end of the horizontal section 61 passes through the fixed base 224 to be disposed in the assembly cavity 2241 and is in communication with the upper fixed seat 1 to be in communication with the cantilever 72, so that the water is supplied to the water inflow joint 6 through the cantilever

72. The vertical section 62 downwardly extends out of the assembly cavity 2241, is disposed in the lifting and lowering rod unit 22, and faces downward. The water inflow passage 3 is in communication with the vertical section 62 of the water inflow joint 6 and the water inlet 511 of the valve base 51. The water inflow passage 3 can be a hose or can be a through hole or a hard pipe penetrating the lifting and lowering rod unit 22 up and down. When the water inflow passage 3 is the hose, the hose is disposed in the lifting and lowering rod unit 22.

The lower end of the lifting and lowering rod 223 is concave to define a mounting groove 228, and a housing 229 is disposed in the mounting groove 228. The fixed block 226 is fixed to the lower end of the lifting and lowering rod 223, and the valve base 51 is fixedly disposed in the housing 229. The fixed block 226 is fixed to the lifting and lowering rod unit 22 to enable the housing 229 to be fixedly disposed in the mounting groove 228, and the valve base 51 is fixedly disposed in the housing 229.

Figure 17:
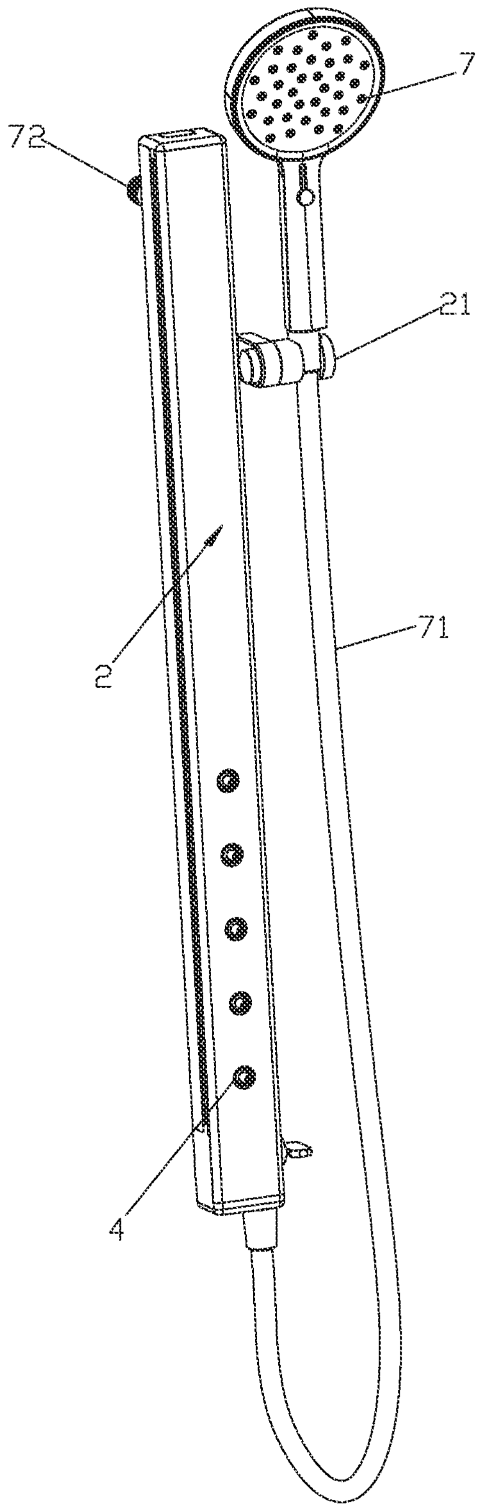
FIG. 17 illustrates a structural drawing of a shower device of Embodiment 1.
Figure 18:
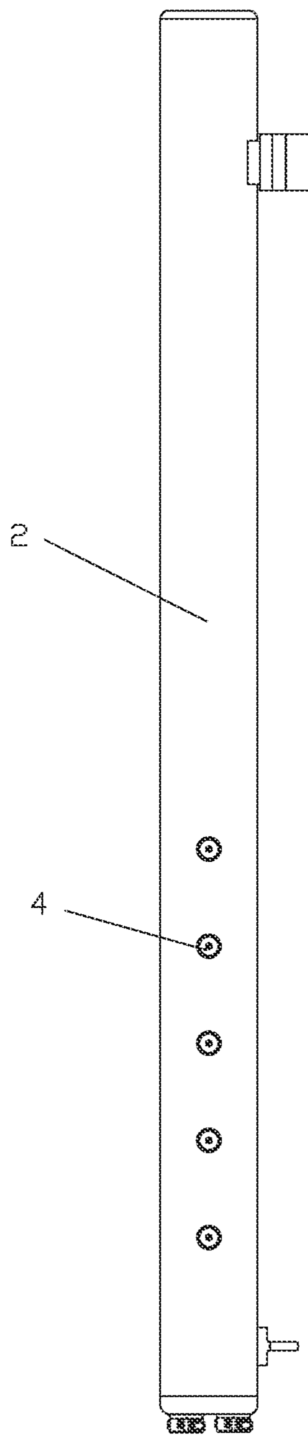
FIG. 18 illustrates a left view of a lifting and lowering rod device of Embodiment 2.
Figure 19:
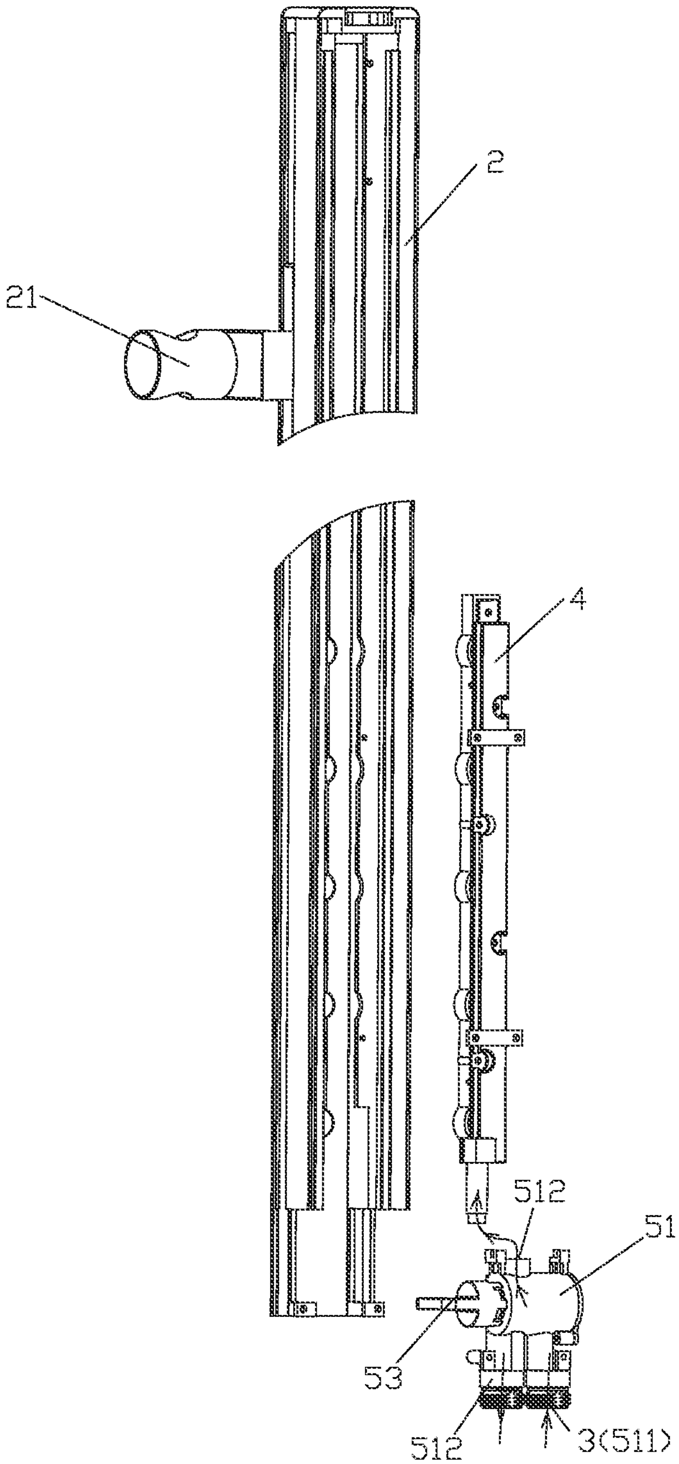
FIG. 19 illustrates an exploded perspective view of the lifting and lowering rod device of Embodiment 2.
Figure 20:
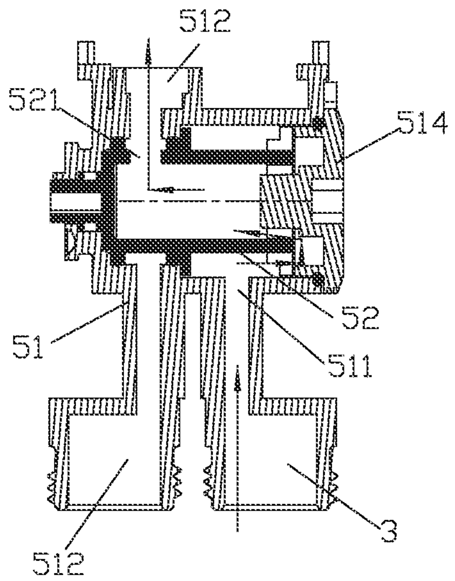
FIG. 20 illustrates a first cross-sectional view of a switching mechanism of Embodiment 2 when water flows out of an upper water dividing hole.
Figure 21:
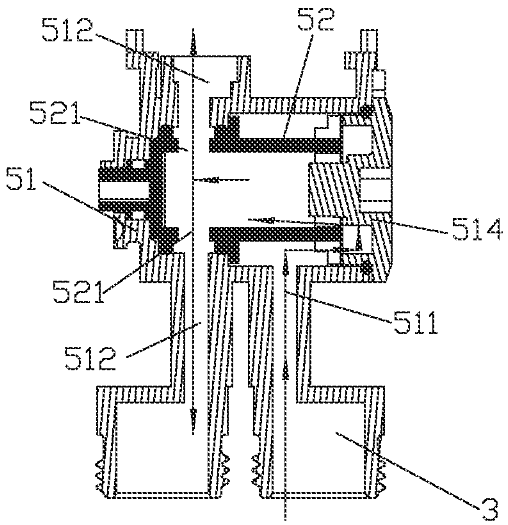
FIG. 21 illustrates a second cross-sectional view of the switching mechanism of Embodiment 2 when the water flows out of the upper water dividing hole and a lower water dividing hole.
Figure 22:
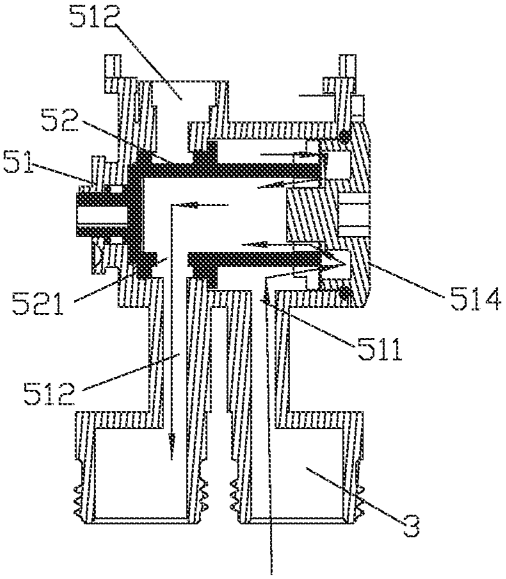
FIG. 22 illustrates a third cross-sectional view of the switching mechanism of Embodiment 2 when the water flows out of the lower water dividing hole.
Figure 23:
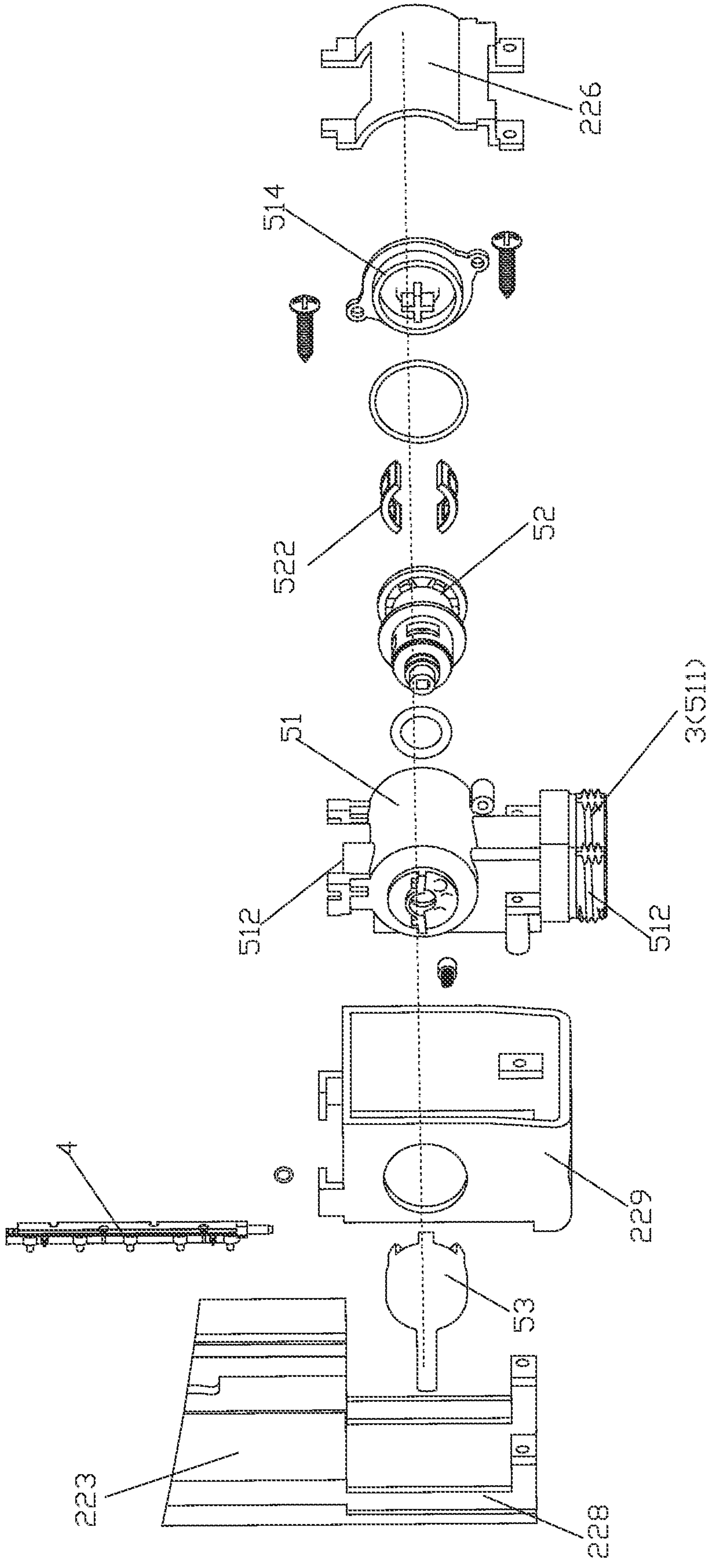
FIG. 23 illustrates an exploded perspective view of the switching mechanism of Embodiment 2.

Referring to FIG. 17, a shower device with the lifting and lowering rod device is provided. The shower device further comprises the hand-held shower 7, and the hand-held shower 7 is in communication with the lower water dividing hole of the lifting and lowering rod device through a first hose 71. The upper fixed seat 1 of the lifting and lowering rod device is screwed to the cantilever 72, and the cantilever 72 is fixed to the wall and can supply water to the external side.

Embodiment 2

Figure 24:
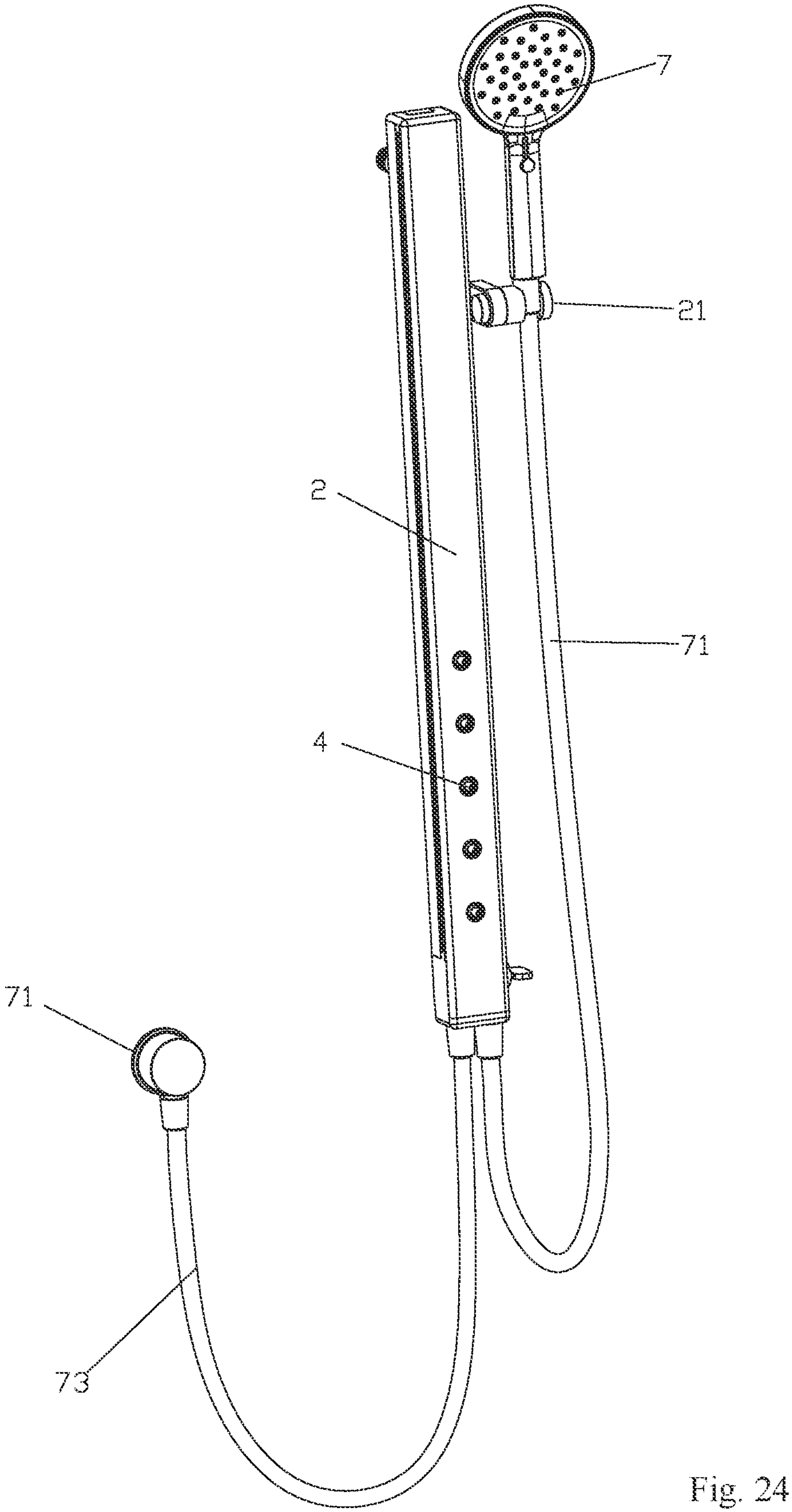
FIG. 24 illustrates a structural drawing of a shower device of Embodiment 2.
Figure 25:
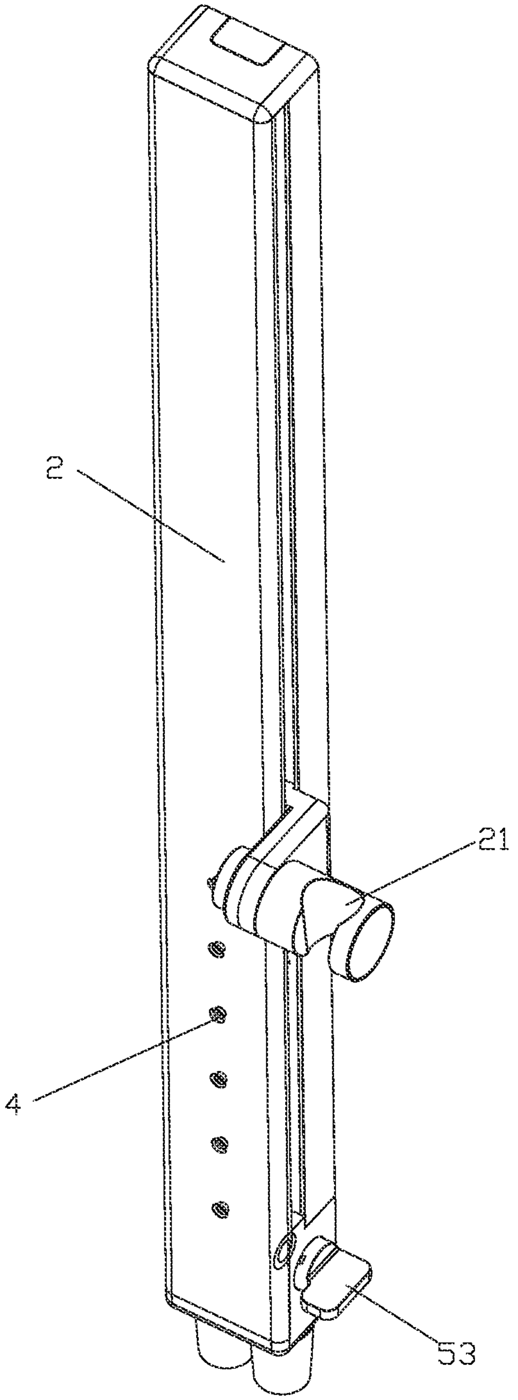
FIG. 25 illustrates a perspective view of a lifting and lowering rod device of Embodiment 3.
Figure 26:
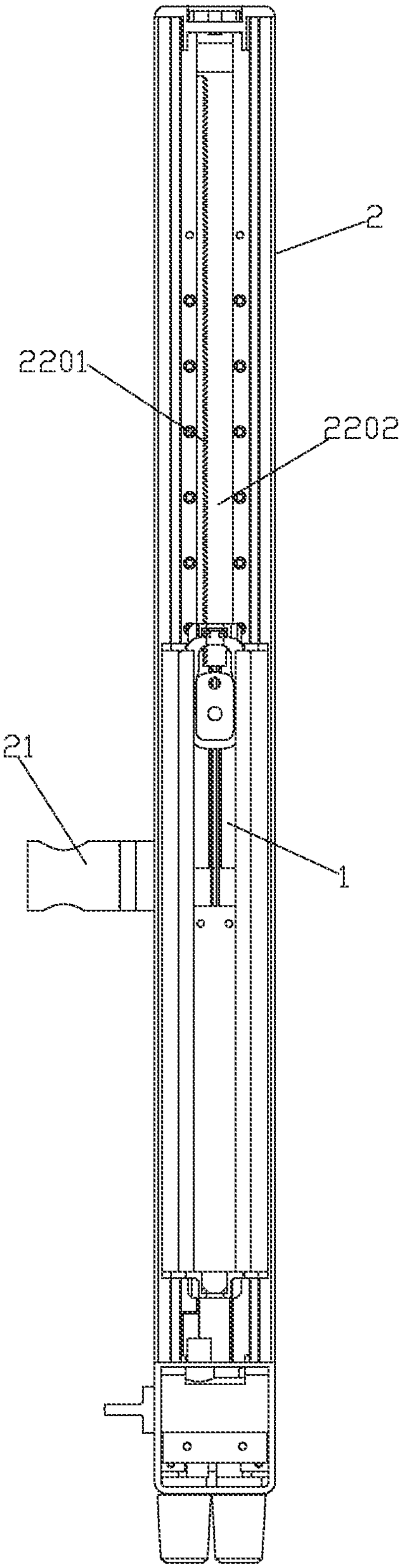
FIG. 26 illustrates a rear view of the lifting and lowering rod device of Embodiment 3.
Figure 27:
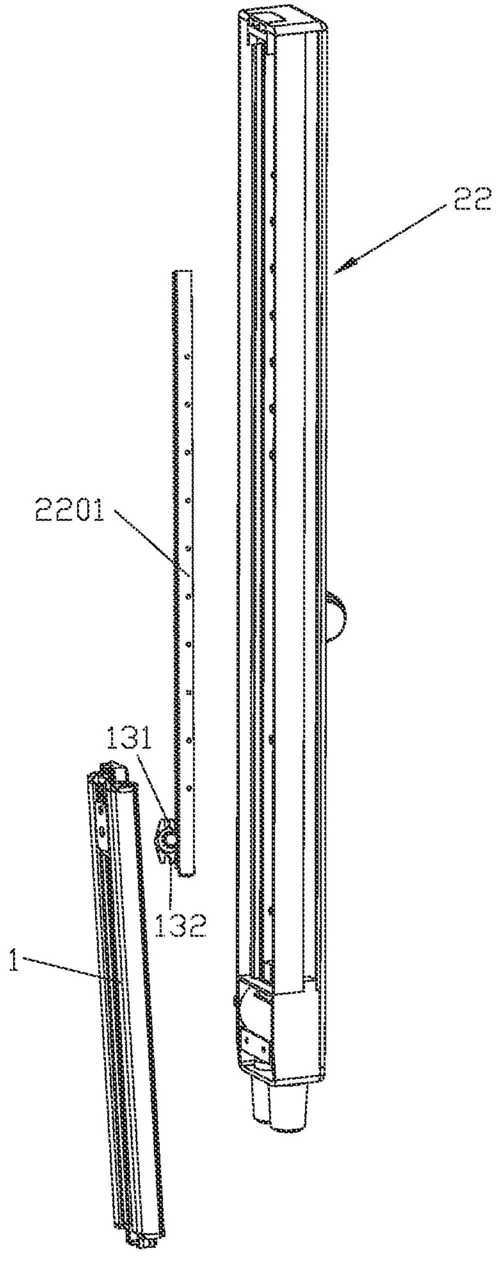
FIG. 27 illustrates a first exploded perspective view of the lifting and lowering rod device of Embodiment 3 when a lifting and lowering rod assembly is in a high position.
Figure 28:
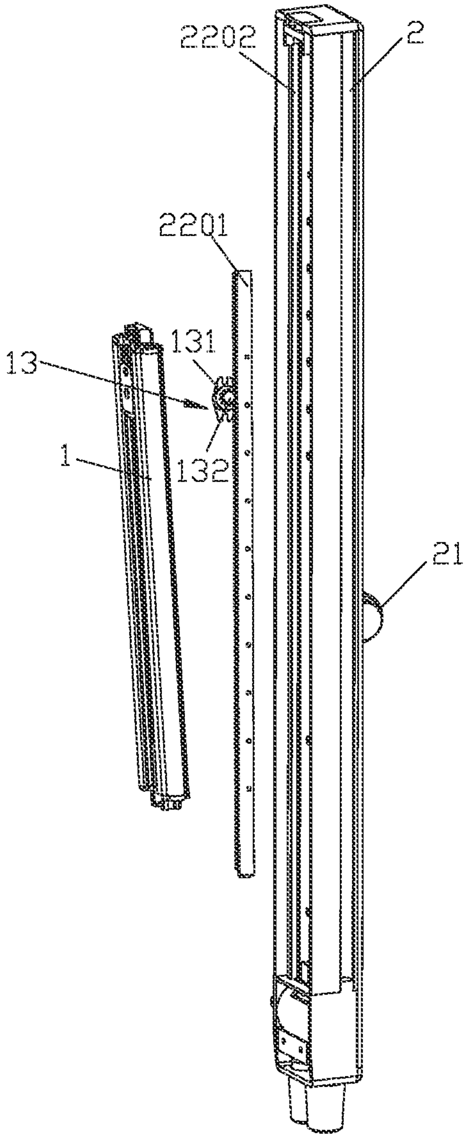
FIG. 28 illustrates a second exploded perspective view of the lifting and lowering rod device of Embodiment 3 when the lifting and lowering rod assembly is in a low position.
Figure 29:
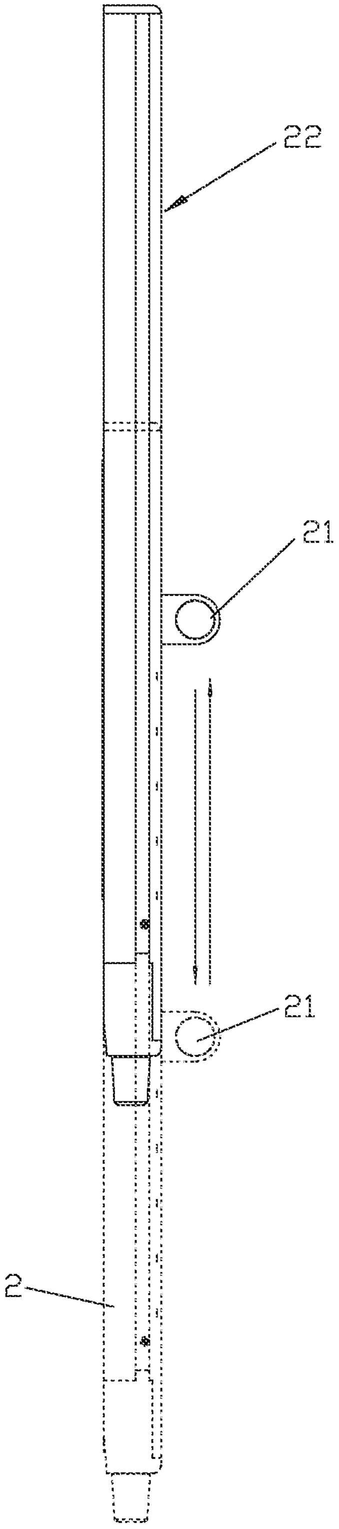
FIG. 29 illustrates a right view of the lifting and lowering rod device of Embodiment 3, wherein a solid line represents the high position and a dashed line represents the low position.
Figure 30:
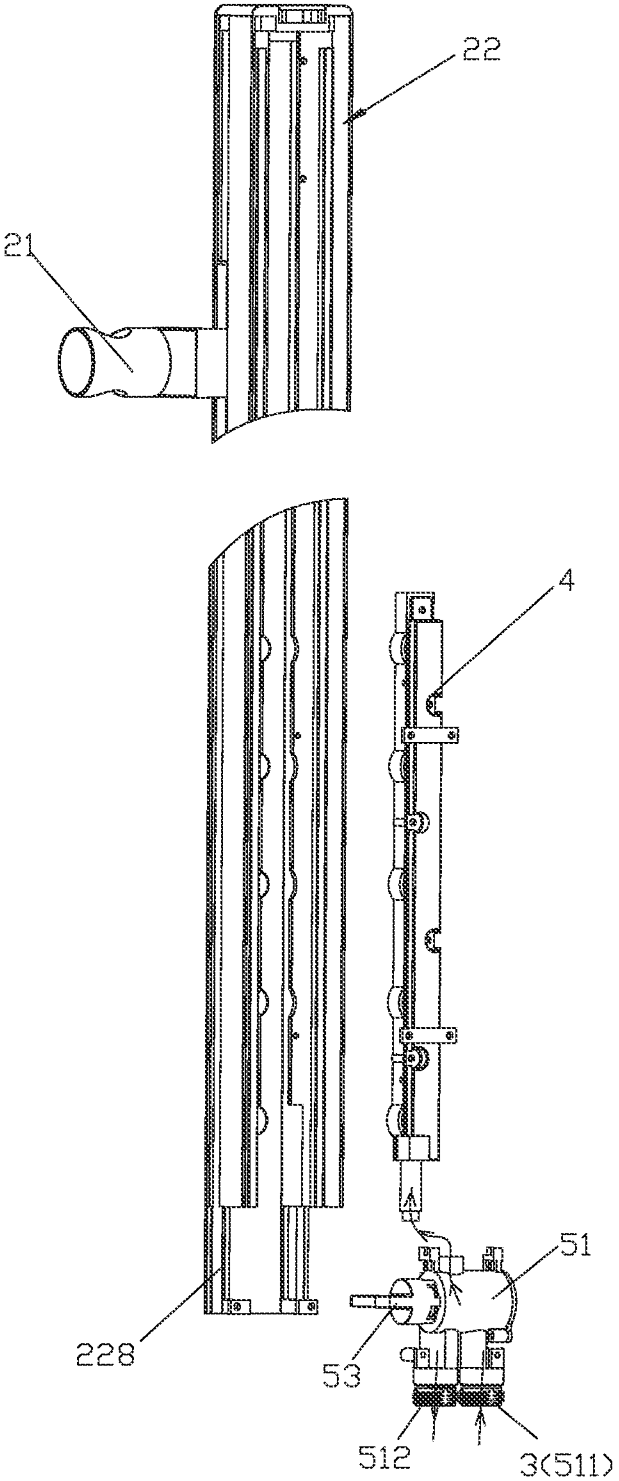
FIG. 30 illustrates a third exploded perspective view of the lifting and lowering rod device of Embodiment 3.
Figure 31:
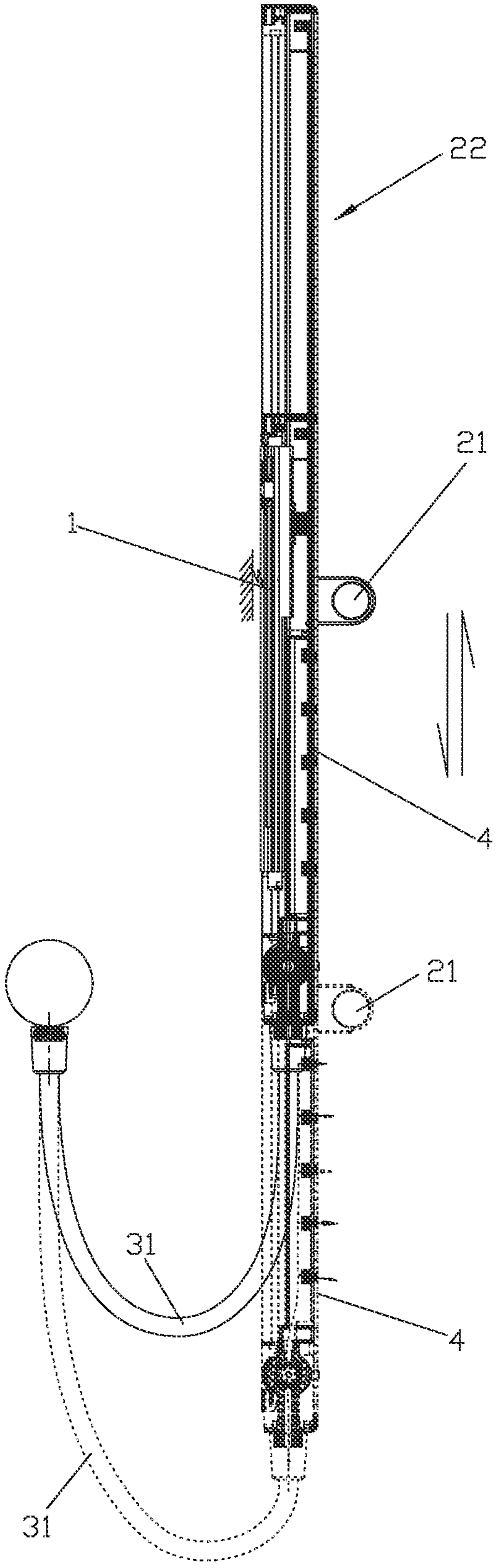
FIG. 31 illustrates a cross-sectional view of the lifting and lowering rod device of Embodiment 3, wherein a solid line represents a high position and a dashed line represents a low position.
Figure 32:
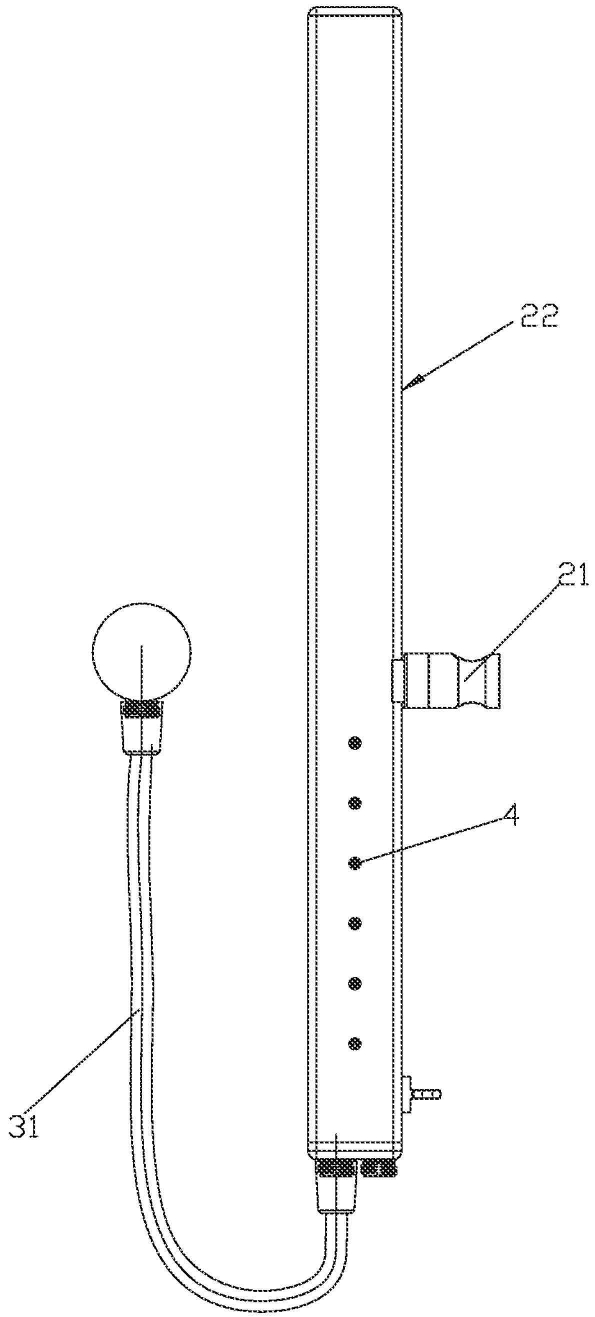
FIG. 32 illustrates a right view of Embodiment 3 when the lifting and lowering rod device is in the low position.
Figure 33:
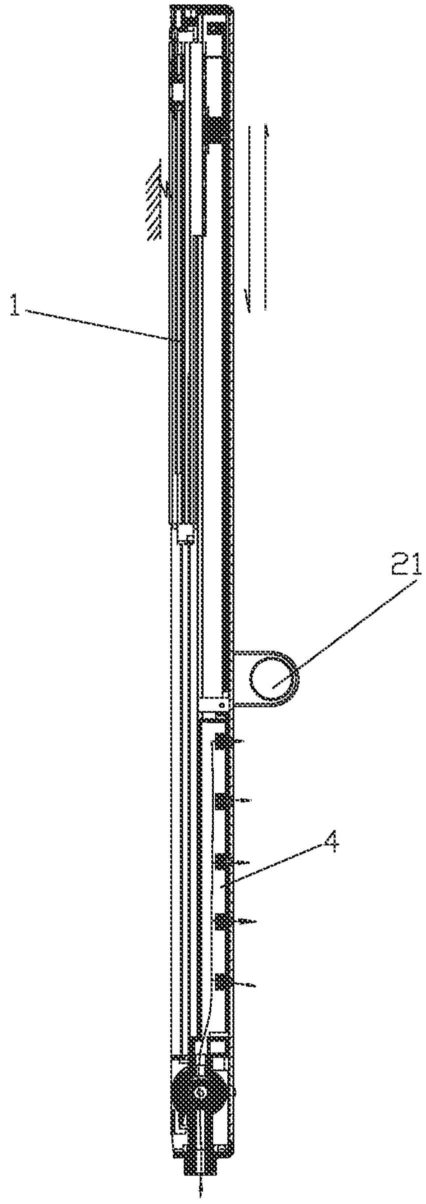
FIG. 33 illustrates a cross-sectional view of the lifting and lowering rod device of FIG. 32.
Figure 34:
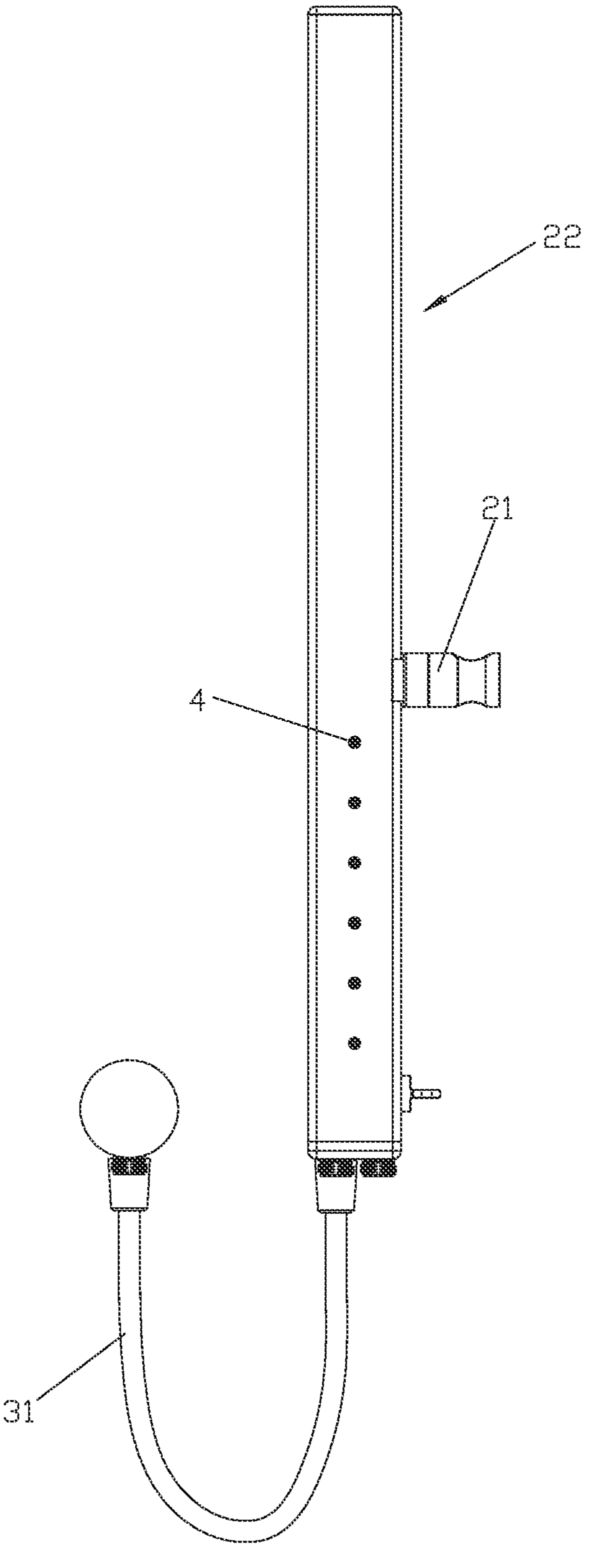
FIG. 34 illustrates a right view of Embodiment 3 when the lifting and lowering rod device is in the high position.
Figure 35:
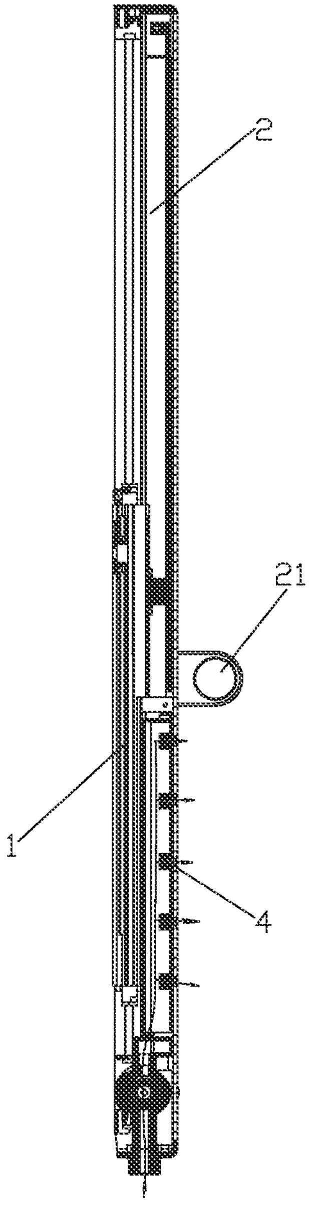
FIG. 35 illustrates a cross-sectional view of the lifting and lowering rod device of FIG. 34.

Embodiment 2 differs from Embodiment 1 in that, referring to FIGS. 18-23, a bottom of the valve base 51 is disposed with the water inlet 511 of the valve base 51, the opening of the water inlet 511 faces downward, and the water inlet 511 downwardly extends to define the water inflow passage 3. The water inflow passage 3 extends out of a bottom portion of the lifting and lowering rod unit 22, and a lower port of the water inflow passage 3 is in communication with the external water source through a water inflow flexible pipe 31. The water inflow passage 3 and the lower water dividing hole are disposed side-by-side. Referring to FIG. 24, the shower device with the lifting and lowering rod device is provided, and the shower device further comprises the hand-held shower 7 and a second hose 73. The hand-held shower 7 is in communication with the lower water dividing hole of the lifting and lowering rod device through the first hose 71, and the water inlet 511 is in communication with the cantilever 72 through the second hose 73.

Embodiment 3

Embodiment 3 differs from Embodiment 2 in that, referring to FIG. 25-35, the lifting and lowering rod unit 22 is connected to the upper fixed seat 1 and is configured to slide up and down relative to the upper fixed seat 1, so that the spray coverage of the water is further expanded and the shower experience is better.

Figure 36:
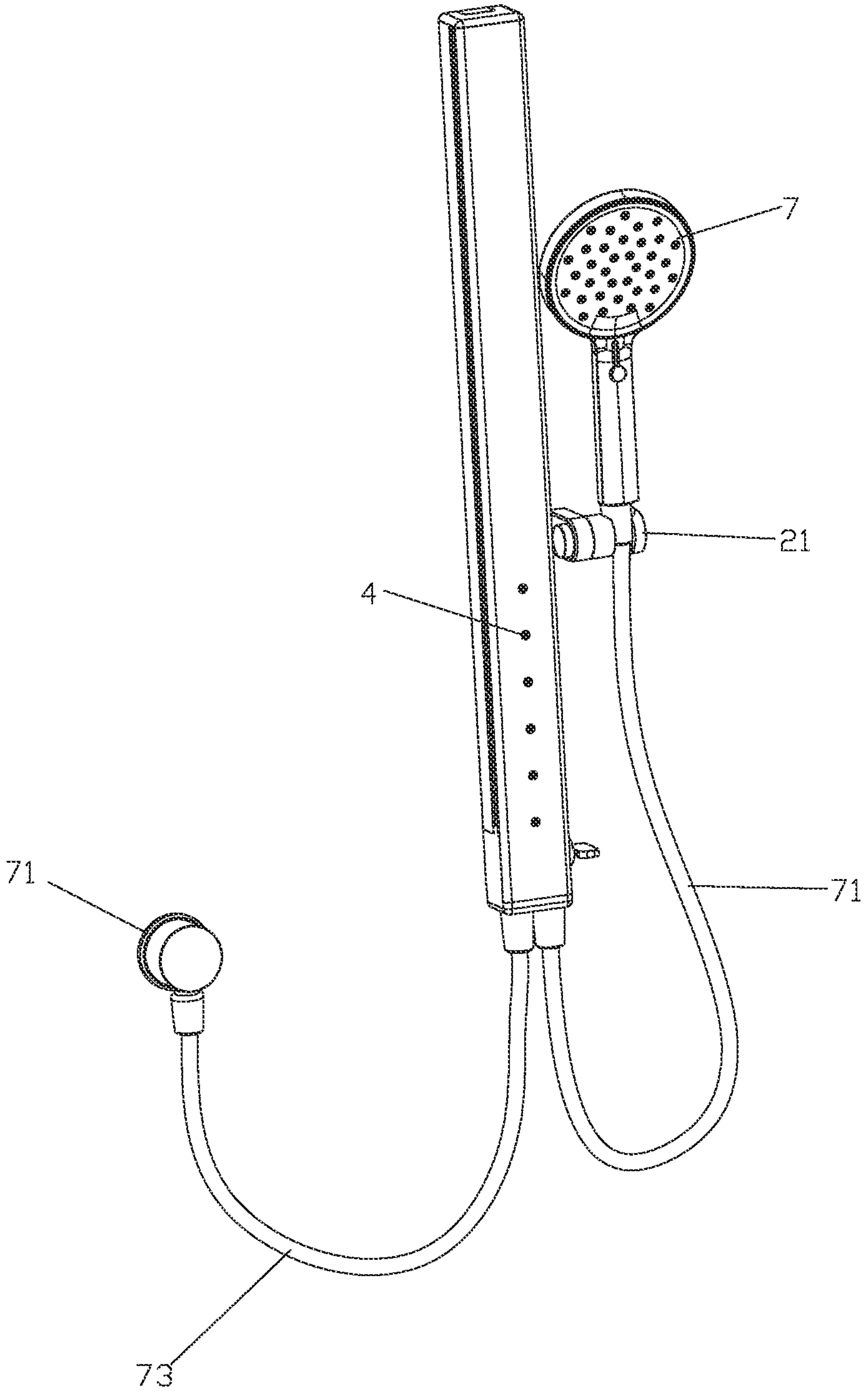
FIG. 36 illustrates a right view of Embodiment 3 when a shower device is in the low position.
Figure 37:
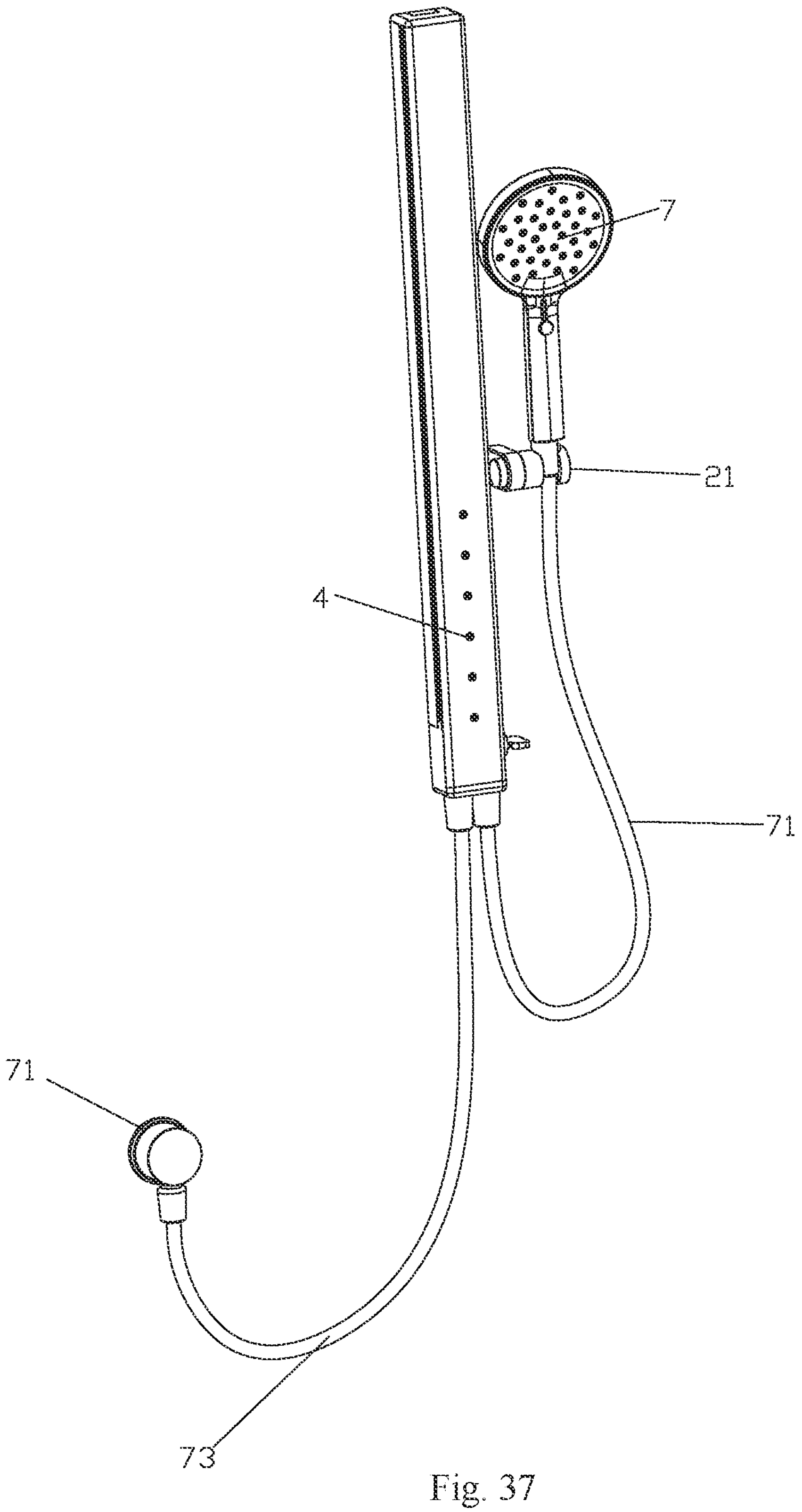
FIG. 37 illustrates another right view of Embodiment 3 when the shower device is in the low position.
Figure 38:
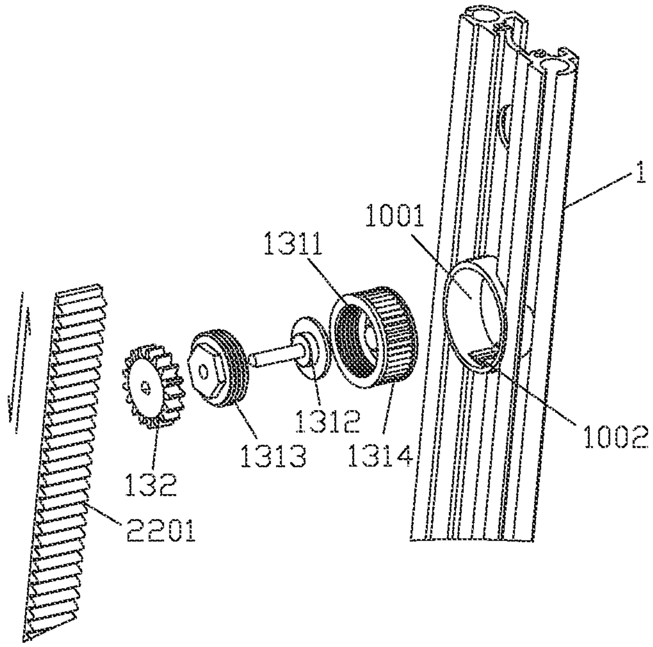
FIG. 38 illustrates a first exploded perspective view of a one-way loaded damping component of Embodiment 3.
Figure 39:
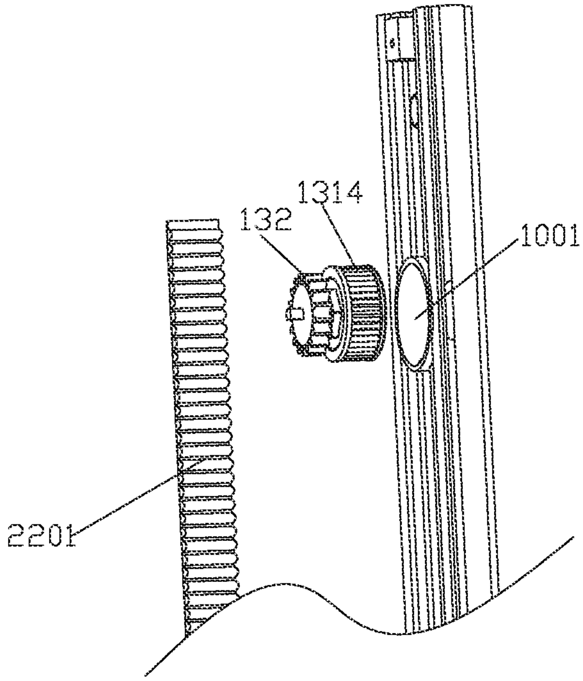
FIG. 39 illustrates a second exploded perspective view of the one-way loaded damping component of Embodiment 3.
Figure 40:
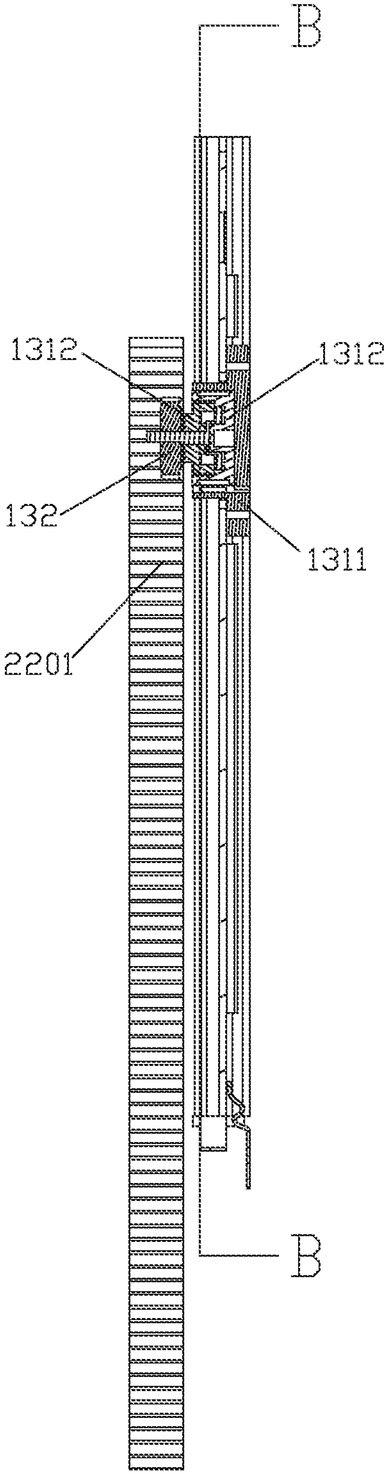
FIG. 40 illustrates a first cross-sectional view of the one-way loaded damping component of Embodiment 3 and is a cross-sectional view along a direction of line A-A of FIG. 41.
Figure 41:
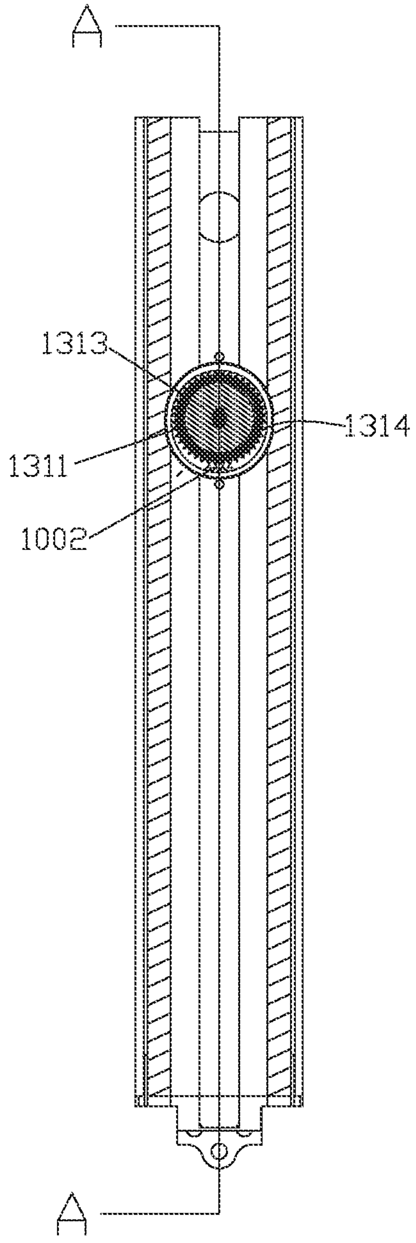
FIG. 41 illustrates a second cross-sectional view of the one-way loaded damping component of Embodiment 3 and is a cross-sectional view along a direction of line B-B of FIG. 40.

The water inflow flexible pipe 31 is a flexible pipe and is configured to change due to following an up-and-down sliding of the lifting and lowering rod unit 22, and the water inflow flexible pipe 31 will not interfere with the up-and-down sliding of the lifting and lowering rod unit 22. A gear component 13 is disposed on the upper fixed seat 1, and the gear component 13 comprises a one-way loaded damping component 131 and a gear 132 fixedly disposed on the upper fixed seat 1. The gear 132 is rotatably connected to the one-way loaded damping component 131. The lifting and lowering rod unit 22 is fixed to a gear rack 2201, and the gear rack 2201 is engaged with the gear 132. When the gear 132 rotates in one direction, the gear 132 is loaded. When the gear 132 rotates in another direction, the gear is not loaded. When the gear rack 2201 slides upward, the one-way loaded damping component 131 does not generate damping. When the gear rack 2201 stops sliding upward, the lifting and lowering rod unit 22 is configured to be maintained at an adjusted position due to the damping generated by the one-way loaded damping component 131 to enable the lifting and lowering rod 223 to be fixed at any position. When the gear rack 2201 slides downward, the damping needs to be overcame. In a detailed structure, a rear surface of the lifting and lowering rod unit 22 is concave to define a connecting groove 2202, the gear rack 2201 is fixedly disposed in the connecting groove 2202, and the upper fixed seat 1 cooperates with and is connected to an inner side of the connecting groove 2202. Referring to FIGS. 36 and 37, the shower device with the lifting and lowering rod device is provided, the shower device further comprises the hand-held shower 7 and the second hose 73. The hand-held shower 7 is in communication with the lower water dividing hole of the lifting and lowering rod device through the first hose 71, and the water inlet 511 is in communication with the cantilever 72 through the second hose 73.

Referring to FIGS. 38-41, the one-way loaded damping component 131 comprises a rotating housing 1311 and a rotating shaft 1312. The rotating shaft 1312 is rotatably disposed in the rotating housing 1311 and a friction force exists between the rotating shaft 1312 and the rotating housing 1311. A detailed structure is as follows: a rotating disc of the rotating shaft 1312 is locked to an inner side of the rotating housing 1311 through a locking block 1313. A shaft portion of the rotating shaft 1312 extends out of the locking block 1313 and is fixedly connected to the gear 132, and an outer side of the rotating housing 1311 is disposed with the gear 132. The outer side of the rotating housing 1311 is disposed with first gear teeth 1314. The upper fixed seat 1 is concave to define an assembly groove 1001, a groove bottom of the assembly groove 1001 comprises second gear teeth 1002, and the one-way loaded damping component 131 is disposed in the assembly groove 1001. The rotating housing 1311 is configured to rotate and move up and down relative to the assembly groove 1001. When the lifting and lowering rod assembly 2 moves upward, the one-way loaded damping component 131 and the gear 132 are driven to slide upward, the first gear teeth 1314 of the rotating housing 1311 are separated from the second gear teeth 1002 of the assembly groove 1001, and an entirety of the one-way loaded damping component 131 and the gear 132 can rotate freely. When the lifting and lowering rod assembly 2 moves downward, the one-way loaded damping component 131 and the gear 132 are driven to slide downward, the first gear teeth 1314 of the rotating housing 1311 are engaged with the second gear teeth 1002 of the assembly groove 1001, and the rotation of the rotating housing 1311 is restricted. At this time, the gear 132 and the rotating shaft 1312 rotate together relative to the rotating housing 1311. The friction force exists between the rotating shaft 1312 and the rotating housing 1311, so the rotation needs to overcome the friction force. To achieve this, when the gear rack 2201 moves upward, the gear rack 2201 does not need to overcome friction (i.e., the friction force) between the rotating shaft 1312 and the rotating housing 1311. When the gear rack 201 moves downward, the gear rack 2201 needs to overcome the friction between the rotating shaft 1312 and the rotating housing 1311. A one-way loaded function of the one-way loaded damping component 131 is achieved.

Embodiment 4

Figure 42:
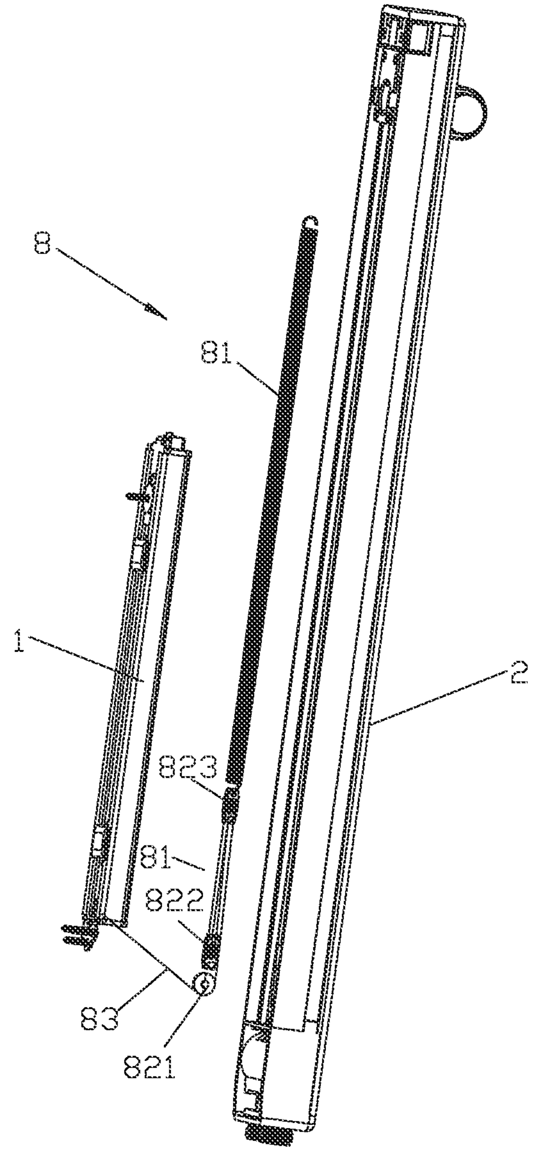
FIG. 42 illustrates an exploded perspective view of a shower device of Embodiment 4.
Figure 43:
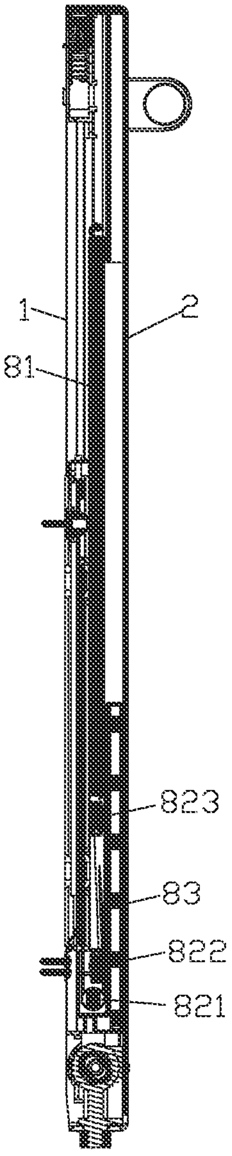
FIG. 43 illustrates a cross-sectional view of the shower device of Embodiment 4.

Embodiment 4 differs from Embodiment 3 in that, referring to FIGS. 42 and 43, an elastic body assembly 8 is disposed between the upper fixed seat 1 and the lifting and lowering rod assembly 2. The elastic body assembly 8 comprises a spring 81, a pulley block 82, and a rope 83. The pulley block 82 comprises a fixed pulley 821, a first moving pulley 822, and a second moving pulley 823. The rope 83 wraps around the fixed pulley 821, the first moving pulley 822, and the second moving pulley 823, and two ends of the rope 83 are respectively connected to the upper fixed seat 1 and the lifting and lowering rod assembly 2. The fixed pulley 821 is disposed on the upper fixed seat 1, and the fixed pulley 821, the first moving pulley 822, and the second moving pulley 823 are upwardly disposed in series. A first end of the rope 83 is connected to the upper fixed seat 1, wraps around the fixed pulley 821, and then wraps around the first moving pulley 822 and the second moving pulley 823. A second end of the rope 83 is connected to the lifting and lowering rod assembly 2. One end of the spring 81 is connected to the upper fixed seat 1, and another end of the spring 81 is connected to the second moving pulley 823. The elastic body assembly 8 is used to balance a driving force, so that a stepless lifting and lowering function that stops along with the lifting and lowering is achieved.

The aforementioned embodiments are merely some embodiments of the present disclosure, and the scope of the disclosure of is not limited thereto. Thus, it is intended that the present disclosure cover any modifications and variations of the presently presented embodiments provided they are made without departing from the appended claims and the specification of the present disclosure.

The invention claimed is:

1. A lifting and lowering rod device with a water outlet terminal, comprising:

one or more fixed seats configured to be connected to a wall, a lifting and lowering rod assembly connected to the one or more fixed seats, and a water inflow passage configured to be in communication with an external water source, wherein:

the water outlet terminal is disposed on the lifting and lowering rod assembly, the water outlet terminal is in communication with the water inflow passage, an inserting base is slidably connected to the lifting and lowering rod assembly and is configured to slide up and down along the lifting and lowering rod assembly, the lifting and lowering rod assembly is configured to slide up and down relative to the one or more fixed seats, an elastic body assembly is disposed between the one or more fixed seats and the lifting and lowering rod assembly, the elastic body assembly comprises a spring, a pull rope, and a pulley block, the pulley block comprises a moving pulley, the pull rope wraps around the pulley block, two ends of the pull rope are respectively connected to the one or more fixed seats and the lifting and lowering rod assembly, and the spring is connected to the moving pulley of the pulley block.

2. The lifting and lowering rod device with the water outlet terminal according to claim 1, wherein:

the water outlet terminal is fixed to the lifting and lowering rod assembly and comprises a plurality of water outlet nozzles, and at least some of the plurality of water outlet nozzles are disposed in an up-and-down direction.

3. The lifting and lowering rod device with the water outlet terminal according to claim 2, wherein:

the water outlet terminal comprises a water outlet cavity base fixedly disposed in the lifting and lowering rod assembly, an inner side of the water outlet cavity base defines a water outlet cavity, the water outlet cavity base comprises a plurality of mounting holes in communication with the water outlet cavity, and the plurality of water outlet nozzles are respectively connected to the plurality of mounting holes and are in communication with the water outlet cavity through the plurality of mounting holes.

4. The lifting and lowering rod device with the water outlet terminal according to claim 3, wherein:

the water outlet terminal comprises a cover fixed to the water outlet cavity base, the cover comprises a plurality of matching holes, the plurality of water outlet nozzles respectively pass through the plurality of matching holes, and the plurality of matching holes cooperate with the plurality of mounting holes to enable the plurality of water outlet nozzles to be configured to swing relatively.

5. The lifting and lowering rod device with the water outlet terminal according to claim 1, comprising:

a switching mechanism disposed on the lifting and lowering rod assembly, wherein:

the switching mechanism comprises at least two water dividing holes configured to be switched to be in communication with the water inflow passage, and one of the at least two water dividing holes is in communication with the water outlet terminal.

6. The lifting and lowering rod device with the water outlet terminal according to claim 5, wherein:

the switching mechanism comprises a valve base and a valve core movably disposed in the valve base, the valve base comprises a water inlet configured to be in communication with the water inflow passage and the at least two water dividing holes, and two water dividing holes of the at least two water dividing holes are disposed up and down, wherein an opening of an upper water dividing hole of the two water dividing holes faces upward and is communication with the water outlet terminal, and an opening of a lower water dividing hole of the two water dividing holes faces downward.

7. The lifting and lowering rod device with the water outlet terminal according to claim 5, wherein:

a lower portion of the lifting and lowering rod assembly is disposed with the switching mechanism, and another one of the at least two water dividing holes is configured to extend out of a bottom end of the lifting and lowering rod assembly.

8. The lifting and lowering rod device with the water outlet terminal according to claim 5, comprising:

a water inflow joint configured to be in communication with the external water source, wherein:

the water inflow passage is disposed in the lifting and lowering rod assembly and is in communication with the water inflow joint and the switching mechanism.

9. The lifting and lowering rod device with the water outlet terminal according to claim 5, wherein:

the switching mechanism comprises a valve base and a valve core movably disposed in the valve base, the valve base comprises a water inlet configured to be in communication with the water inflow passage and the at least two water dividing holes, and the water inflow passage comprises the water inlet.

10. The lifting and lowering rod device with the water outlet terminal according to claim 9, wherein:

a lower portion of the lifting and lowering rod assembly is disposed with the switching mechanism, and an outer port of the water inflow passage extends out of a bottom end of the lifting and lowering rod assembly.

11. The lifting and lowering rod device with the water outlet terminal according to claim 1, wherein:

the water inflow passage is in communication with a water pipe configured to be in communication with the external water source, and the water pipe is telescopic or is made of flexible material.

12. The lifting and lowering rod device with the water outlet terminal according to claim 1, wherein:

the lifting and lowering rod assembly is connected to the one or more fixed seats and is configured to slide up and down, and the water inflow passage comprises a water pipe that is telescopic or made of flexible material.

13. A shower device comprising the lifting and lowering rod device with the water outlet terminal according to claim 1.

* * * * *